(12) United States Patent
Robertson

(10) Patent No.: US 11,991,948 B1
(45) Date of Patent: May 28, 2024

(54) DYNAMICALLY ADJUSTABLE CROP PLANTER WHEEL

(71) Applicant: Brian G. Robertson, Frisco, TX (US)

(72) Inventor: Brian G. Robertson, Frisco, TX (US)

( * ) Notice: Subject to any disclaimer, the term of this patent is extended or adjusted under 35 U.S.C. 154(b) by 0 days.

(21) Appl. No.: 17/459,247

(22) Filed: Aug. 27, 2021

Related U.S. Application Data

(63) Continuation-in-part of application No. 17/099,601, filed on Nov. 16, 2020, now Pat. No. 11,191,215.

(51) Int. Cl.
*A01C 5/06* (2006.01)

(52) U.S. Cl.
CPC .............. *A01C 5/066* (2013.01); *A01C 5/064* (2013.01)

(58) Field of Classification Search
CPC ......... A01C 5/066; A01C 5/064; B60B 19/04; B60B 15/10
See application file for complete search history.

(56) References Cited

U.S. PATENT DOCUMENTS

| | | | |
|---|---|---|---|
| 3,802,743 A * | 4/1974 | Hermanns | B60B 25/02 301/5.1 |
| 4,570,554 A | 2/1986 | Clark | |
| 5,487,692 A * | 1/1996 | Mowrer | A63H 17/262 446/448 |
| 5,492,390 A * | 2/1996 | Kugelmann, Sr. | B60B 19/00 301/5.1 |
| 7,380,618 B2 * | 6/2008 | Gunderson | B62D 49/0635 180/7.1 |
| 9,757,978 B1 * | 9/2017 | Emigh | B60B 9/28 |
| 9,814,172 B2 * | 11/2017 | Achen | A01C 7/203 |
| 10,299,427 B2 | 5/2019 | Sivinski et al. | |
| 10,906,352 B2 * | 2/2021 | Hein | B60B 15/22 |
| 2010/0141018 A1 * | 6/2010 | McCue | B60B 19/04 301/5.1 |
| 2012/0104834 A1 * | 5/2012 | Sgherri | B60B 15/18 301/45 |
| 2013/0167991 A1 * | 7/2013 | Donohue | B60B 21/00 152/5 |
| 2013/0333599 A1 | 12/2013 | Bassett et al. | |

(Continued)

FOREIGN PATENT DOCUMENTS

| | | | | |
|---|---|---|---|---|
| CN | 108184384 A | * | 6/2018 | ............... A01C 7/06 |
| CN | 112534987 A | * | 3/2021 | ............... A01C 1/00 |
| CN | 113099780 A | * | 7/2021 | |

(Continued)

*Primary Examiner* — Alicia Torres

(74) *Attorney, Agent, or Firm* — Law Office of Sam Sokhansanj PLLC

(57) ABSTRACT

A dynamically adjustable crop planter wheel or disc that can modify its outer configuration or tooth pattern to automatically adjust to any style, shape, size, or configuration depending on specific soil characteristics in real-time, thereby improving planting efficiency and throughput and further minimizing or eliminating any downtime, among other advantages. In particular, the adjustable crop planter wheel can include a first plurality of members projecting from a central hub, wherein the first plurality of members are disposed in a concentric configuration. The planter wheel can further include one or more actuators in communication with the first plurality of members, wherein the actuators are configured to move each of the first plurality of members, and a controller in communication with the one or more actuators.

17 Claims, 20 Drawing Sheets

(56) References Cited

U.S. PATENT DOCUMENTS

2018/0092295 A1* 4/2018 Sugumaran .......... G05D 1/0214
2018/0154687 A1* 6/2018 Hein ....................... B60B 15/22

FOREIGN PATENT DOCUMENTS

| DE | 102011002107 A1 | * | 10/2012 | ............. B60B 19/00 |
| DE | 102016008280 A1 | * | 1/2018 | ............. B60B 19/04 |
| DE | 202018005552 U1 | * | 3/2019 | |
| FR | 2885008 A1 | * | 11/2006 | ........... A01B 29/043 |
| FR | 2997651 A3 | * | 5/2014 | ............... B60B 1/14 |
| KR | 2012075027 A | * | 7/2012 | |
| RU | 2681296 C1 | * | 3/2019 | |

* cited by examiner

DYNAMICALLY ADJUSTABLE CROP PLANTER WHEEL

CROSS-REFERENCE TO RELATED APPLICATIONS

This application is a continuation-in-part (CIP) of U.S. Non-Provisional application Ser. No. 17/099,601 filed on Nov. 16, 2020, which is incorporated herein by reference in its entirety.

BACKGROUND

This section is intended to introduce the reader to aspects of art that may be related to various aspects of the present disclosure described herein, which are described and/or claimed below. This discussion is believed to be helpful in providing the reader with background information to facilitate a better understanding of the various aspects of the present disclosure described herein. Accordingly, it should be understood that these statements are to be read in this light, and not as admissions of prior art.

In agricultural applications, farmers have typically used row crop planters with varying style wheels to open a trench, plant seeds, and to close a trench in till, reduced till, and no-till scenarios. Generally, row planter units can include a pair of angularly disposed opening discs or wheels to form a V-shaped opening trench or furrow in the soil into which seeds are planted. The opener wheels are followed by a pair of gauge wheels that control the depth of the furrow opened by the opening wheels, and aid in holding the V-shaped profile of the furrow. The gauge wheel may be followed by a closing wheel for closing a trench. Although most planters may include three wheels (or three pairs of wheels), some other types of planters may include more. These planters can sub-divide a function into one or more wheels. For example, they may have a wheel to semi-open the trench, then another style wheel to finish opening the trench. This method allows for a more complex trench shape than just one wheel can accomplish. The same method may apply to closing the trench with multiple wheels. Further, in no-till planting applications, some planters may also utilize a row cleaner wheel, which creates a clean seedbed.

Based on the different tillage systems, and to achieve optimum results, the agricultural industry has recognized a need for using different opening, gauge, planting, and closing wheel or disc designs for various soil conditions. With the advent of no-till farming, numerous types of planter wheels have been marketed to address specific needs of planted seeds (e.g., corn seed), as well as non-optimal soil conditions. For example, one popular type of closing wheel is a toothed closed wheel, which has become a dominant type of closing wheel in both no-till and conventional farming. However, the availability of different types of toothed closing wheels presents additional problems because each type of wheel is directed to limited planting applications. For example, corn planting requires seed-to-soil contact in which sufficient weight must be applied on the seed to ensure firming of the seed into the soil. Certain toothed wheel designs tend to be optimized for a limited range of conditions and seed depths. As such, different toothed wheels are required by different levels of tillage.

Another factor that affects selection of different closing wheels is caused by levels of soil that can stick, adhere or otherwise attach to the wheel. Different soil conditions can cause many different levels of attachment of soil to the wheel that result in different tendencies of soil adherence to the closing wheel. The different soil adherence alters performance of the planter wheels, and, accordingly, different types of planter wheels need to be selected to increase the performance of the planter wheels based on the particular soil conditions. Further, other soil conditions and characteristics that factor into the choice of planting wheel include a percentage of clay deposits, percentage of loam deposits, percentage of sand deposits, percentage of silt deposits, soil moisture levels, and soil temperature levels, among others. Changing planting wheels is expensive, time consuming and sometimes a matter of guesswork as to which will be the best for an application. Many times, with only so many planting days, and with unpredictable weather, the operator does not even have the option to change planting wheels. Accordingly, the current conventional method and selecting, choosing, and installing various types of planter wheels greatly reduces efficiency and throughput, and further increases downtime.

Hence, what is needed are planting wheels for a planter that can dynamically change their tooth pattern or outer configuration to an optimal style, shape, size, or configuration based on unique soil characteristics in real-time, thereby improving planting efficiency and throughput and further minimizing or eliminating any downtime.

BRIEF SUMMARY

In one aspect of the disclosure described herein, dynamically adjustable crop planter wheel or disc is disclosed for a planter that can dynamically change its tooth pattern or outer configuration to an optimal style, shape, size, or configuration based on unique soil characteristics and conditions in realtime, thereby improving planting efficiency and throughput and further minimizing or eliminating any downtime. Here, by eliminating the need to manually change or switch planting wheels or guess at which may be the best, dynamic planting wheel of the disclosure described herein can utilize various sensors, environmental and historical data to determine the optimal planting wheel configuration in real-time. Planting wheels have a direct correlation to proper seed contact with soil, plant emergence, emergence consistency, and yields among others.

Here, the dynamic planting wheel or disc of the disclosure described herein can include various independent extending and retracting members which may be of plastic, metal, steel, or composite materials. In particular, each member can move independent of any other member of the wheel. With independent movement of the members, the wheel is able to change to any shape, configuration, tread, or size as allowed by the movement. In one aspect, each member may be connected to an independent actuator to facilitate movement or it may use magnetic or electromagnetic forces to move the member, among other available mechanisms. Here, each actuator or force, which can be controlled via a controller, can apply static or dynamic pressure to each member to move in a pre-defined direction and distance. Accordingly, this provides the operator or an automated intelligence system the ability to dynamically change down pressure for the planting condition if needed or desired.

Further, the actuators or forces are connected to the controller for controlling their operation which is further connected (or communicates with) a computerized or automated intelligence (AI) system. The planter operation can control the wheel configuration by the computerized system, in this case the operator could change the wheels in real-time if so desired to any style or configuration, or the wheel configuration can be changed dynamically in real-time by an automated intelligence system or machine learning algorithm that may use sensors, historical data, network and environmental data to determine the optimal wheel configuration in real-time.

For example, such sensors for providing input and feedback to the computer system and controller may include sensors pertaining to soil composition, soil temperature, atmospheric temperature, planter depth, soil moisture, planter speed, planter downforce, seed type, seed treatment, seed-to-soil contact, soil density around seed, crop residue in furrow, salt density, oxygenation efficiency, furrow depth, furrow width, furrow closure, residue cover or depth, tillage or no-tillage, tiled or not tiled, drainage, seed orientation, coulter depth, furrow opening, furrow side-wall compaction, cloddy soil density, soil compaction density, seed rot percentage, seed variety, seed brand, seed size, seed shape, seed density, seed coating, seed population, seed singulator, seed cell, seed firmer, seed disc, seed drum, seed trench, meter type, meter speed, meter size, meter accuracy, seed spacing, seed skips, seed multiples, seed uniformity, hopper volume, hopper weight, weed density, chemicals sprayed, planting dates, disc size, drum size, disk weight, brush settings, seeding rates, air pressure, vacuum pressure, vacuum settings, tire pressure, toolbar alignment, toolbar settings, hitch alignment, land slope, land drainage, carrying wheels, gauge wheels, tractor speed, planter speed, among others. Environmental data may include atmospheric temperature, humidity, elevation, pressure, wheel weight, wheel diameter, among others. Historical information may include wheel configurations, wheel weight, wheel diameter, wheel composition, sensor data and associated plant emergence and yield data, global positioning information, yield, disease, maturity times, planting population, plant emergence consistency, germination, seed orientation, seed rot percentage, furrow side-wall compaction, furrow closure, furrow opening, furrow width, furrow depth, coulter depth, seed variety, seed brand, seed treatment, weed density, chemicals sprayed, planting dates, seeding rates, among others. Network information may include sensor, environmental, historical data as well as associated wheel configuration to help the operator or automated intelligence system choose the optimal wheel configuration.

In another aspect of the disclosure described herein, an adjustable crop planter wheel or disc for a row planter is disclosed. The planter wheel can include a first plurality of articulating members projecting from a central hub, wherein the first plurality of members are disposed in a concentric configuration, or the wheel having a concentric configuration via the orientation of the plurality of members. The planter wheel can further include one or more actuators in communication with the first plurality of members, wherein the actuators are configured to move each of the first plurality of members, and a controller in communication with the one or more actuators. In addition, the first plurality of members can each have a corresponding actuator. Here, the one or more actuators are comprised of at least one of: a hydraulic member, pneumatic member, electric member, thermal member, magnetic member, mechanical member, various micro mechanical systems, micro-actuators, micro-sensors, and micro-electronics such as micro-electromechanical systems (MEMS) devices and actuators, electric motor, DC motor, brush motor, brushless motor, AC brushless motor, DC brushless motor, direct drive, linear motor, servo motors, stepper motor, or variable speed motor.

In addition, a second plurality of articulating members may be disposed adjacent to the first plurality of members, wherein the second plurality of members are disposed in a concentric configuration, or the wheel having a concentric configuration via the orientation of the plurality of members. Further, the first plurality of members can be configured to adjust a configuration of an outer perimeter of the crop planter wheel. Here, the first plurality of members can be configured to adjust the configuration of crop planter wheel to a toothed or serrated wheel, disc, gear, or blade. In addition, the first plurality of members are comprised of at last one of: rods, bars, poles, shafts, shanks, spokes, or pillars. Here, wherein each of the first plurality of members are disposed at predefined spacings relative to each other or disposed at equal spacings relative to each other. Further, the first plurality of members can also be coupled to a crop row planter.

In addition, the adjustable crop planter wheel or a row crop planter can include one or more sensors for detecting one or more of: soil composition, soil temperature, atmospheric temperature, planter depth, soil moisture, planter speed, planter downforce, seed type, seed treatment, seed-to-soil contact, soil density around seed, crop residue in furrow, salt density, oxygenation efficiency, furrow depth, furrow width, furrow closure, residue cover or depth, tillage or no-tillage, tiled or not tiled, drainage, seed orientation, coulter depth, furrow opening, furrow side-wall compaction, cloddy soil density, soil compaction density, seed rot percentage, seed variety, seed brand, seed size, seed shape, seed density, seed coating, seed population, seed singulator, seed cell, seed firmer, seed disc, seed drum, seed trench, meter type, meter speed, meter size, meter accuracy, seed spacing, seed skips, seed multiples, seed uniformity, hopper volume, hopper weight, weed density, chemicals sprayed, planting dates, disc size, drum size, disk weight, brush settings, seeding rates, air pressure, vacuum pressure, vacuum settings, tire pressure, toolbar alignment, toolbar settings, hitch alignment, land slope, land drainage, carrying wheels, gauge wheels, tractor speed, planter speed, among others, atmospheric temperature, humidity, elevation, pressure, wheel weight, wheel diameter, wheel configurations, wheel weight, wheel diameter, wheel composition, plant emergence and yield data, global positioning information, yield, disease, maturity times, planting population, plant emergence consistency, germination, seed orientation, seed rot percentage, furrow side-wall compaction, furrow closure, furrow opening, furrow width, furrow depth, coulter depth, seed variety, seed brand, seed treatment, weed density, chemicals sprayed, planting dates, and seeding rates.

The above summary is not intended to describe each and every disclosed embodiment or every implementation of the disclosure. The Description that follows more particularly exemplifies the various illustrative embodiments.

BRIEF DESCRIPTION OF THE DRAWINGS

The following description should be read with reference to the drawings, in which like elements in different drawings are numbered in like fashion. The drawings, which are not necessarily to scale, depict selected embodiments and are not intended to limit the scope of the disclosure. The disclosure may be more completely understood in consideration of the following detailed description of various embodiments in connection with the accompanying drawings, in which.

DETAILED DESCRIPTION

Figure 1:
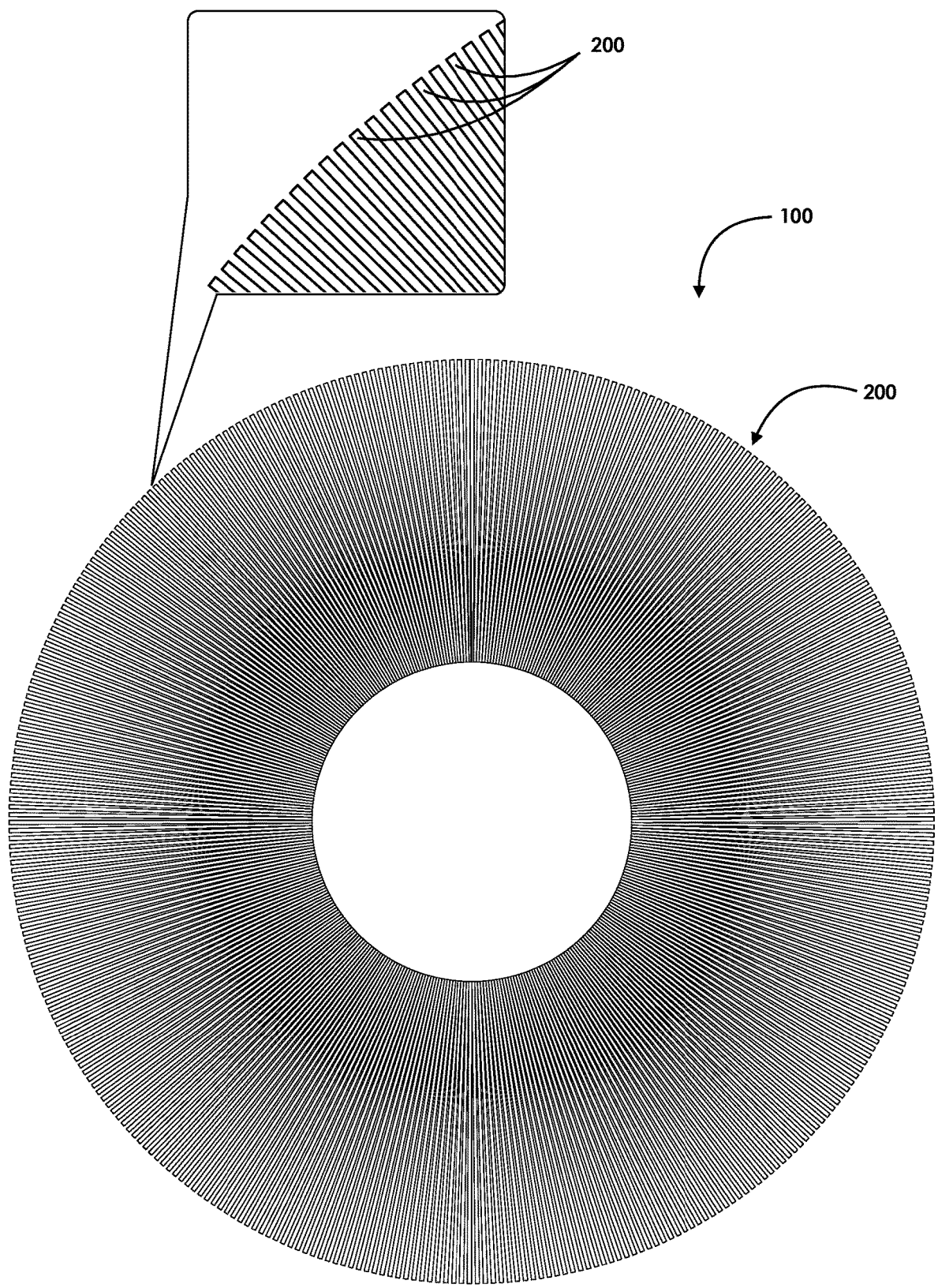
FIG. 1 illustrates a side view for one non-limiting exemplary embodiment of a configuration for a dynamically adjustable crop planter wheel of the disclosure described herein, and a close-up side view of the planter wheel's articulating members.

In the Brief Summary of the present disclosure above and in the Detailed Description of the disclosure described herein, and the claims below, and in the accompanying drawings, reference is made to particular features (including method steps) of the disclosure described herein. It is to be understood that the disclosure of the disclosure described herein in this specification includes all possible combinations of such particular features. For example, where a particular feature is disclosed in the context of a particular aspect or embodiment of the disclosure described herein, or a particular claim, that feature can also be used, to the extent possible, in combination with and/or in the context of other particular aspects and embodiments of the disclosure described herein, and in the disclosure described herein generally.

The embodiments set forth below represent the necessary information to enable those skilled in the art to practice the disclosure described herein and illustrate the best mode of practicing the disclosure described herein. In addition, the disclosure described herein does not require that all the advantageous features and all the advantages need to be incorporated into every embodiment of the disclosure described herein.

In one implementation of the disclosure described herein, a display page may include information residing in the computing device's memory, which may be transmitted from the computing device over a network to a central database center and vice versa. The information may be stored in memory at each of the computing device, a data storage resided at the edge of the network, or on the servers at the central database centers. A computing device or mobile device may receive non-transitory computer readable media, which may contain instructions, logic, data, or code that may be stored in persistent or temporary memory of the mobile device, or may somehow affect or initiate action by a mobile device. Similarly, one or more servers may communicate with one or more mobile devices across a network, and may transmit computer files residing in memory. The network, for example, can include the Internet, wireless communication network, or any other network for connecting one or more mobile devices to one or more servers.

Any discussion of a computing or mobile device may also apply to any type of networked device, including but not limited to mobile devices and phones such as cellular phones (e.g., an iPhone®, Android®, Blackberry®, or any "smart phone"), a personal computer, iPad®, server computer, or laptop computer; personal digital assistants (PDAs) such as a Palm-based device or Windows® CE device; a roaming device, such as a network-connected roaming device; a wireless device such as a wireless email device or other device capable of communicating wireless with a computer network; or any other type of network device that may communicate over a network and handle electronic transactions. Any discussion of any mobile device mentioned may also apply to other devices, such as devices including Bluetooth®, near-field communication (NFC), infrared (IR), and Wi-Fi functionality, among others.

Phrases and terms similar to "software", "application", "app", and "firmware" may include any non-transitory computer readable medium storing thereon a program, which when executed by a computer, causes the computer to perform a method, function, or control operation.

Phrases and terms similar "network" may include one or more data links that enable the transport of electronic data between computer systems and/or modules. When information is transferred or provided over a network or another communications connection (either hardwired, wireless, or a combination of hardwired or wireless) to a computer, the computer uses that connection as a computer-readable medium. Thus, by way of example, and not limitation, computer-readable media can also comprise a network or data links which can be used to carry or store desired program code means in the form of computer-executable instructions or data structures and which can be accessed by a general purpose or special purpose computer.

Phrases and terms similar to "portal" or "terminal" may include an intranet page, internet page, locally residing software or application, mobile device graphical user interface, or digital presentation for a user. The portal may also be any graphical user interface for accessing various modules, features, options, and/or attributes of the disclosure described herein. For example, the portal can be a web page accessed with a web browser, mobile device application, or any application or software residing on a computing device.

Figure 15A:
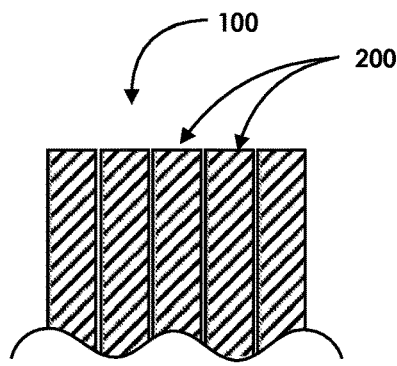
FIG. 15A illustrates a partial front view of the articulating members of the dynamically adjustable crop planter wheel depicted in a row according to one non-limiting exemplary embodiment, further illustrating partial cross-sectional front views of the articulating members.
Figure 15B:
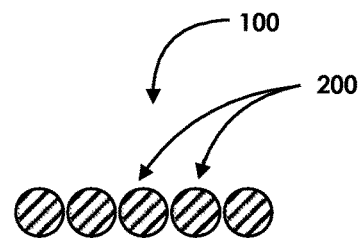
FIG. 15B illustrates a partial top view of the articulating members of the dynamically adjustable crop planter wheel of FIG. 15A, further illustrating partial cross-sectional top views of the articulating members.
Figure 15C:
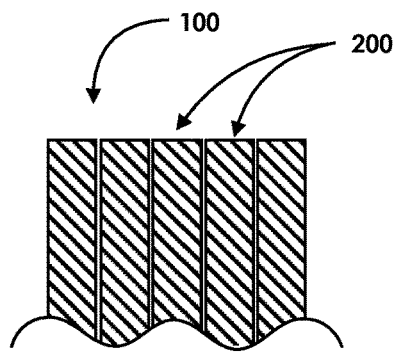
FIG. 15C illustrates a partial front view of the articulating members of the dynamically adjustable crop planter wheel depicted in a row according to one non-limiting exemplary embodiment, further illustrating partial cross-sectional front views of the articulating members.
Figure 15D:
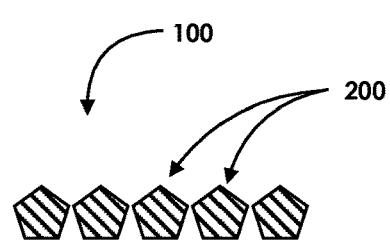
FIG. 15D illustrates a partial top view of the articulating members of the dynamically adjustable crop planter wheel of FIG. 15C, further illustrating partial cross-sectional top views of the articulating members.
Figure 15E:
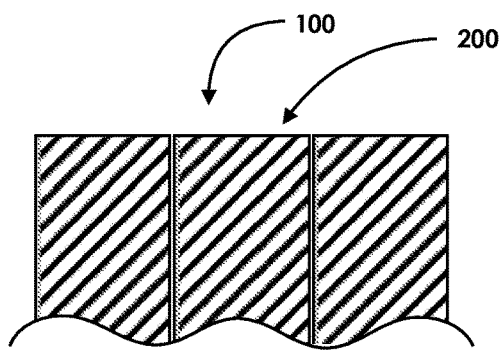
FIG. 15E illustrates a partial front view of the articulating members of the dynamically adjustable crop planter wheel depicted in a row according to one non-limiting exemplary embodiment, further illustrating partial cross-sectional front views of the articulating members.
Figure 15F:
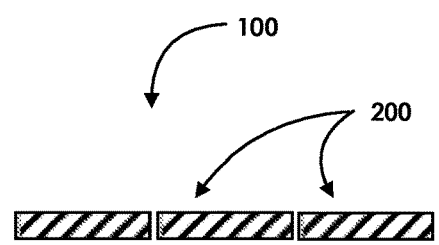
FIG. 15F illustrates a partial top view of the articulating members of the dynamically adjustable crop planter wheel of FIG. 15E, further illustrating partial cross-sectional top views of the articulating members.

FIG. 1 illustrates one non-limiting exemplary embodiment of the dynamically adjustable crop planter wheel, disc, gear, blade, or drum 100 of the disclosure described herein, depicting wheel 100 in a round, concentric, or initial operational state configuration. Here, wheel 100 can include a plurality of independently articulating members 200 that can move and articulate in any lateral, transverse, vertically, horizontally, or angled orientation or direction. In particular, each member 200 may be a rod, bar, pole, shaft, shank, spoke, pillar, or support. In addition, each member 200 may have any cross-sectional configuration, such as shown in FIGS. 15B, 15D, and 15F. For example, each member 200 may have a cross-sectional configuration having a square, rectangular, round, ellipsoid, abstract, asymmetrical, triangular, pentagonal, hexagonal, octagonal, parallelogram, or any other shape having three or more sides.

Figure 2:
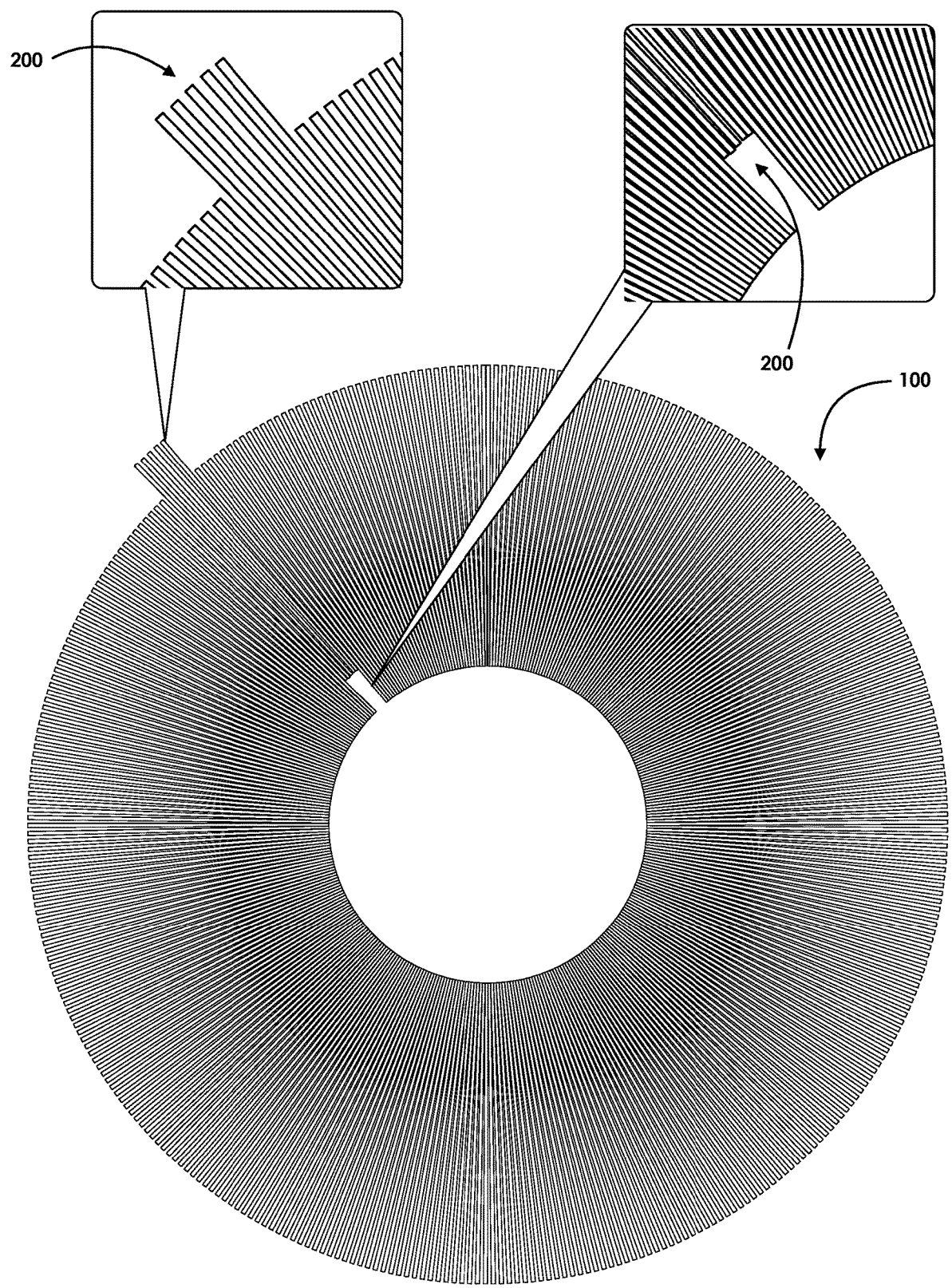
FIG. 2 illustrates a side view for another non-limiting exemplary embodiment of a configuration for the dynamically adjustable crop planter wheel of the disclosure described herein, and close-up side views of the planter wheel's articulating members.

FIG. 2 illustrates wheel 100 in an operational or partial operational state configuration, depicting a group of members 200 shown extended or protruded outwards from wheel 100, thereby forming a pattern, style, or configuration. Here, the group of members 200 are shown to articulate and move outwards relative to their neighboring or adjacent articulating members. As shown with respect to FIGS. 16A-16D, each individual member 200 can be operated and controlled via mechanical or electro-mechanical actuator 210 or via electrical or magnetic force or energy 220, among others. However, it is contemplated within the scope of the present disclosure described herein that any of actuators 210 or 220 can be any component that is capable of providing work, energy, propulsion, or force to any of members 200, which include but are not limited to, hydraulic components, pneumatic components, electric components, thermal components, magnetic components, mechanical components, various micro mechanical systems, micro-actuators, micro-sensors, and micro-electronics such as micro-electromechanical systems (MEMS) devices and actuators, electric motor, DC motor, brush motor, brushless motor, AC brushless motor, DC brushless motor, direct drive, linear motor, servo motors, stepper motor, or variable speed motor. Moreover, each independent or group of actuators 210 or 220 can be controlled via any type of controller, microcontroller, integrated circuit (IC), or computing device, among others. In addition, each member 200 or group of members 200 may be controlled via any nanotechnology related means to operate, move, and articulate any of members 200 or group of members 200, including but not limited to, various nano-dimensional devices.

Still referring to FIG. 2, any of members 200 or group of members 200 can move to any desired location, height, width, or distance to achieve a desired tooth or tread configuration around the circumference or outer periphery of wheel 100. Here, once each member 200 is in its desired location or position, actuators 210 or 220 may effectively lock each member 200 in place or otherwise prevent each member 200 from collapsing inward within wheel 100 due to external weight, pressure, or torsional force exerted on each member 200 during planting operations. In the alternative, each actuator 210 or 220 may allow each member 200 to be biased or provide minimal spring-like or hydraulic loaded biasing to each member 200, such that each member absorbs shock, in order to minimize damage to each member 200 and/or the actuators. In addition, each wheel 100 can have any number of members 200 depending on the desired application, such as from about 10 articulating members up to and including about 5,000 articulating members. Further, the spacing or gap between each individual member 200 can range from about one (1) mm up to and including about 50 mm, or preferably equal to or less than seven (7) mm with respect to each other. In addition, member 200 may have up to six (6) degrees of freedom. Further each member may be at least 20 mm in length. In addition, each member 200 can be made of metal, steel, carbon steel, alloy steel, stainless steel, iron, aluminum, magnesium, copper, brass, bronze, zinc, titanium, tungsten, nickel, cobalt, silicon, plastic, various polymers, polyvinyl, or any combination thereof, or composite material.

Figure 3:
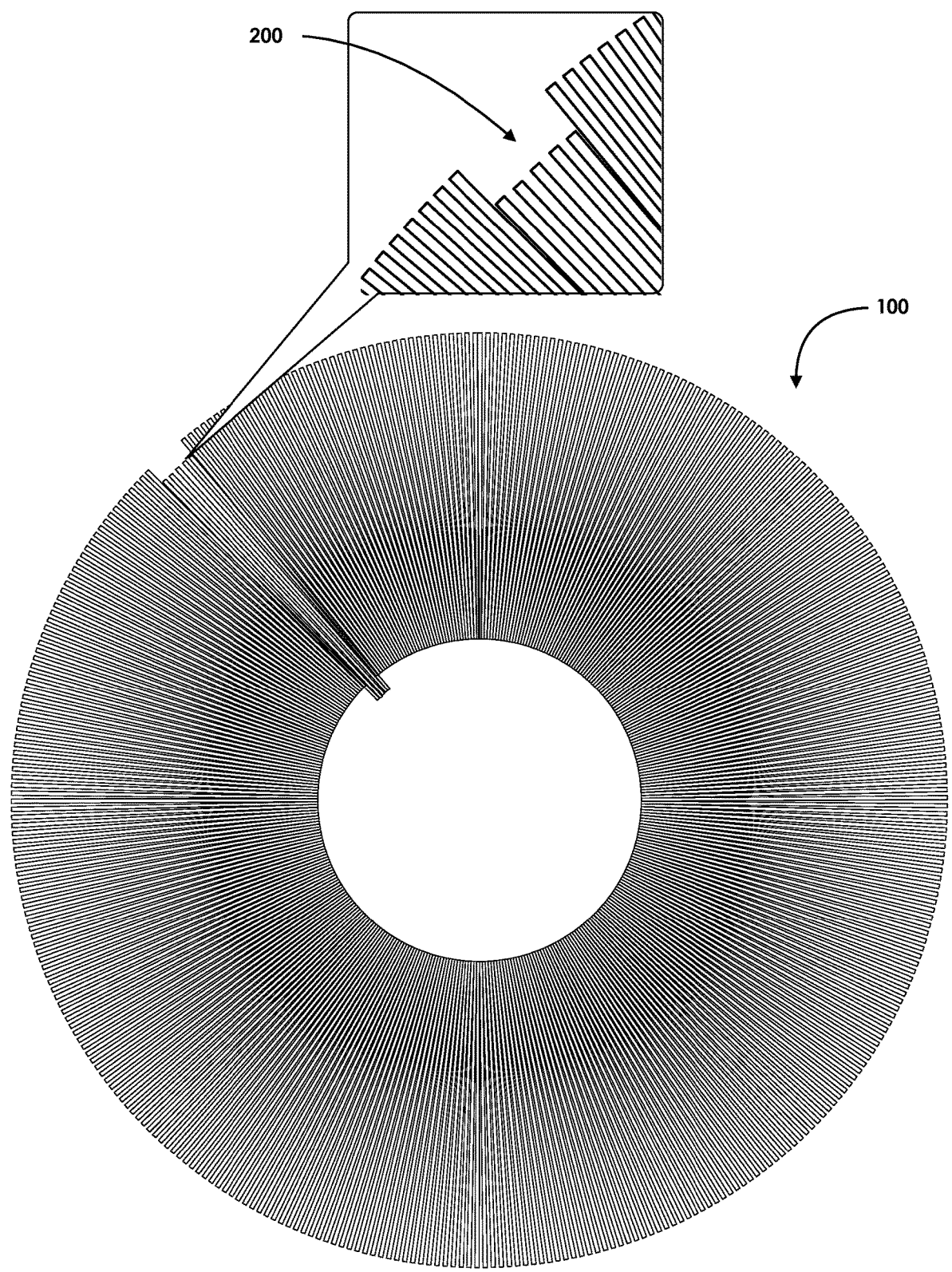
FIG. 3 illustrates a side view for another non-limiting exemplary embodiment of a configuration for the dynamically adjustable crop planter wheel of the disclosure described herein, and a close-up side view of the planter wheel's articulating members.
Figure 4:
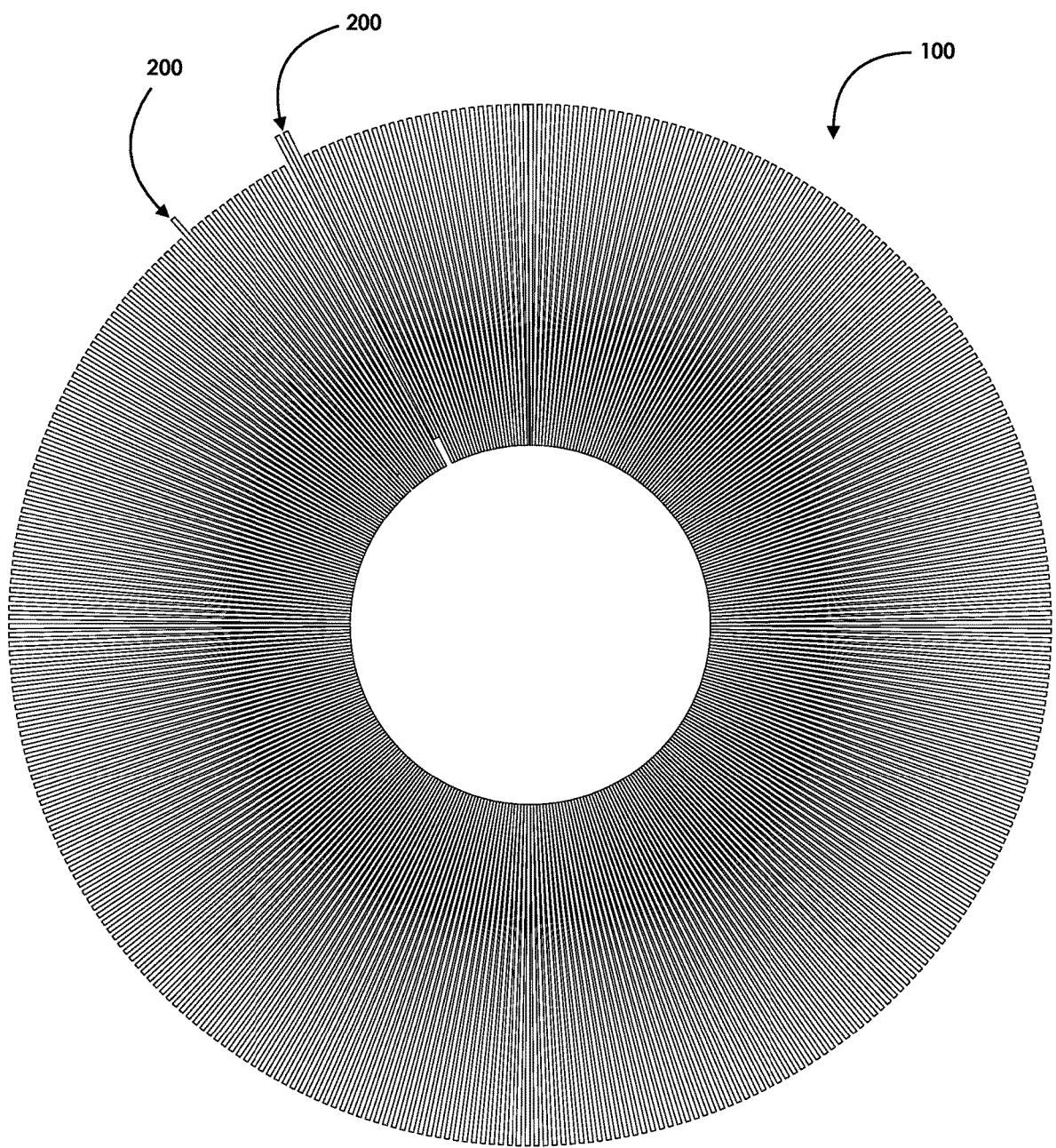
FIG. 4 illustrates a side view for another non-limiting exemplary embodiment of a configuration for the dynamically adjustable crop planter wheel of the disclosure described herein.
Figure 5:
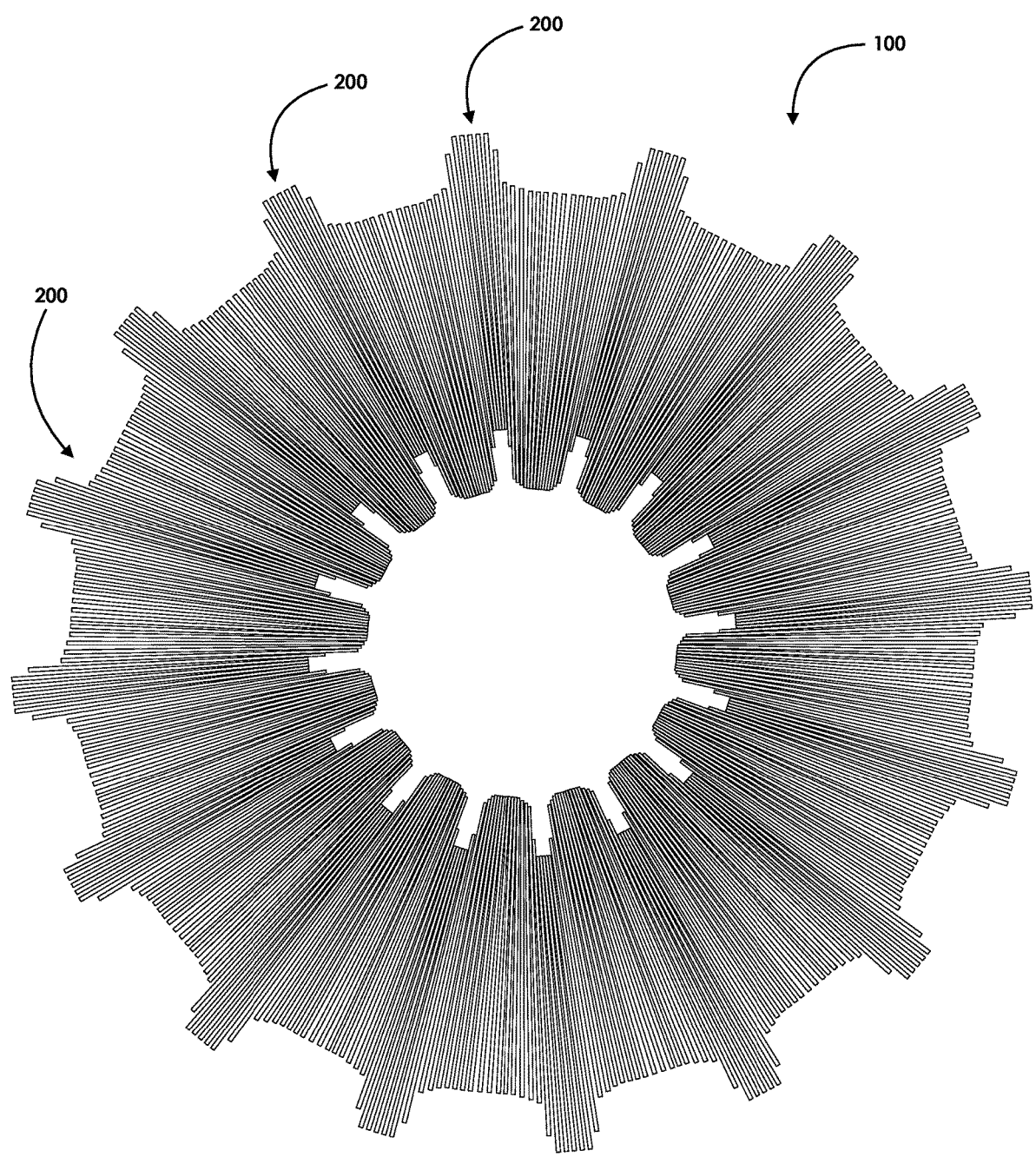
FIG. 5 illustrates a side view for another non-limiting exemplary embodiment of a configuration for the dynamically adjustable crop planter wheel of the disclosure described herein.
Figure 6:
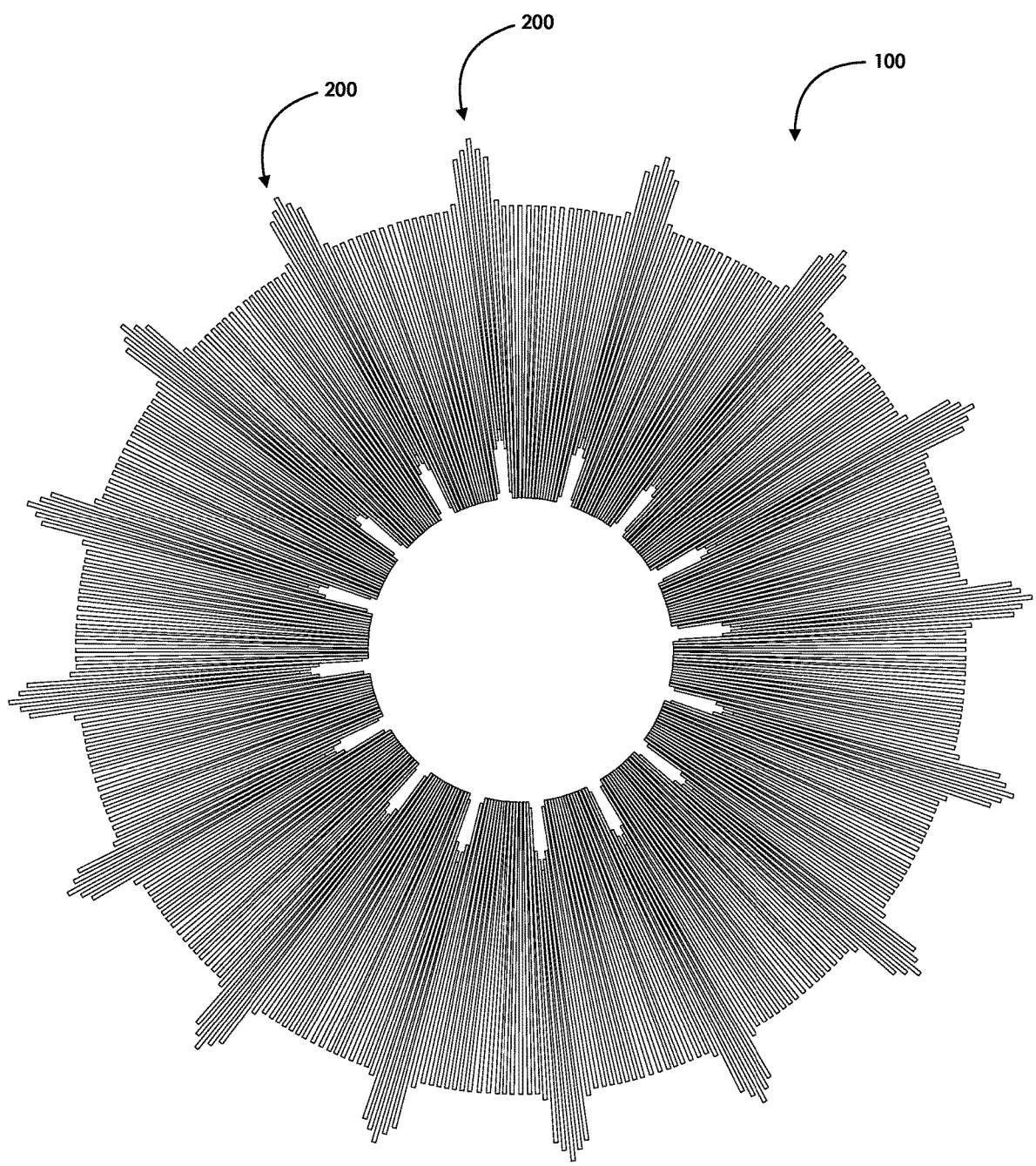
FIG. 6 illustrates a side view for another non-limiting exemplary embodiment of a configuration for the dynamically adjustable crop planter wheel of the disclosure described herein.
Figure 7:
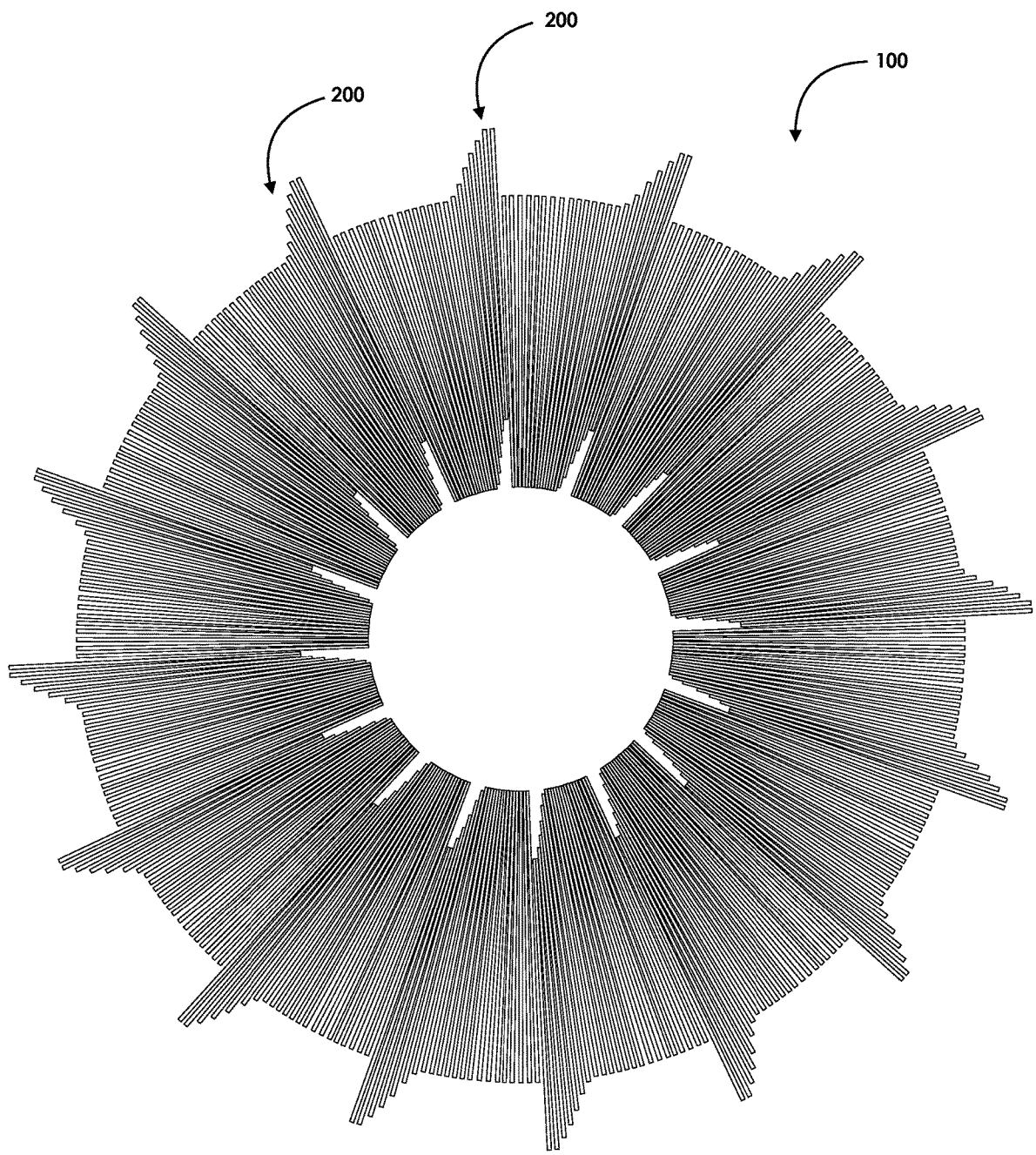
FIG. 7 illustrates a side view for another non-limiting exemplary embodiment of a configuration for the dynamically adjustable crop planter wheel of the disclosure described herein.
Figure 8:
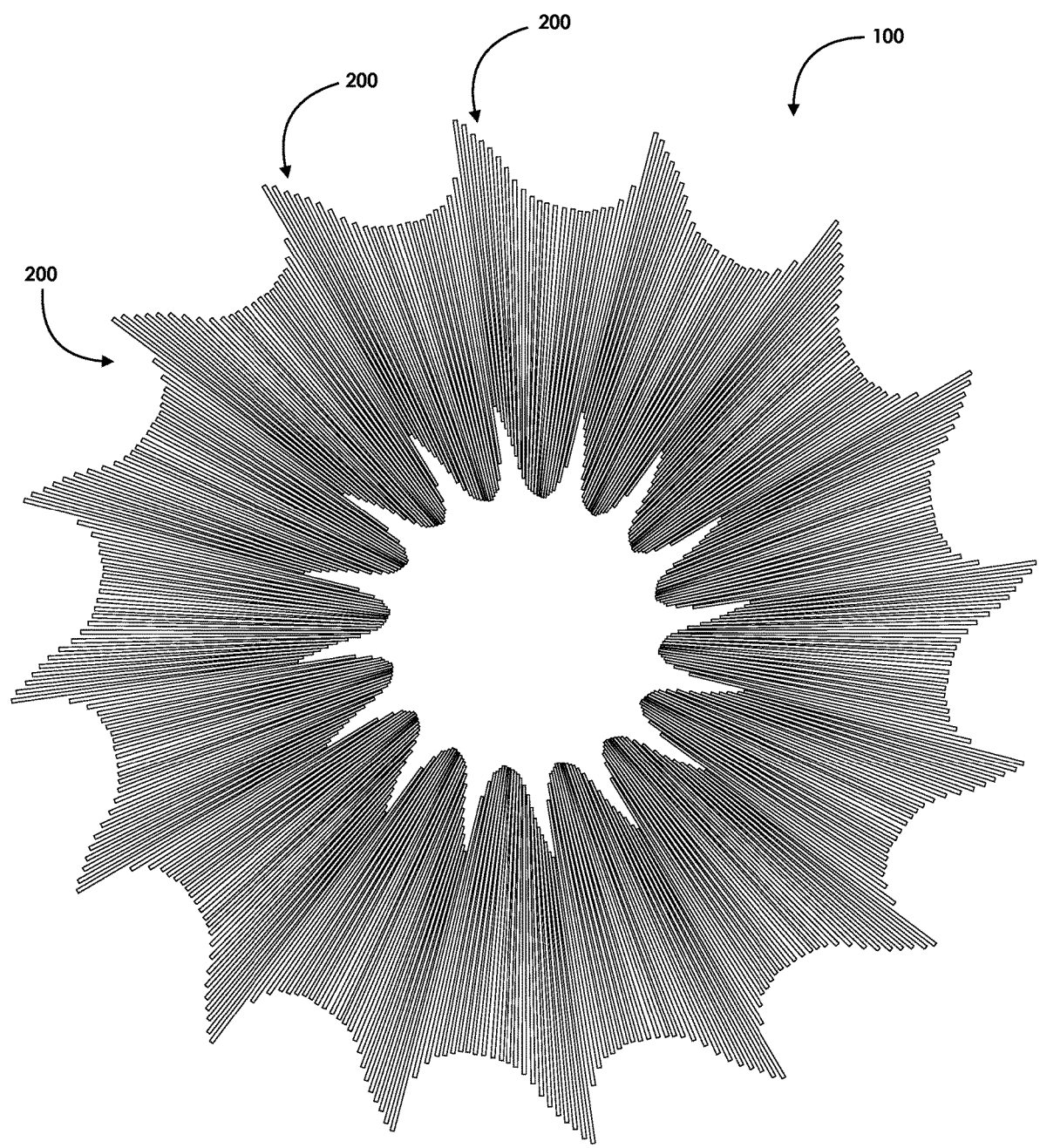
FIG. 8 illustrates a side view for another non-limiting exemplary embodiment of a configuration for the dynamically adjustable crop planter wheel of the disclosure described herein.

FIG. 3 illustrates that any of members 200 or group of members 200 may also articulate, move, and project inwards within wheel 100 in order to alter or adjust the outer perimeter, periphery, or circumference shape of wheel 100. FIG. 4 illustrates at least one individual member 200 and two members 200 being independently controlled, moved, and articulated and projected outwards from wheel 100 via the actuators (not shown). FIG. 5-8 illustrate various exemplary configurations for wheel 100 having multiple toothed members formed via the articulation of members 200. Still referring to FIGS. 5-8, the controller for wheel 100 can transmit commands to each actuator associated with its respective individual member 200 or group of members 200 to move and adjust their position in order to obtain the desired tooth or tread pattern or configuration for wheel 100, depending on the desired crop planting operation or application. In particular, the disclosure described herein allows an operator (or via an AI computing device system) to immediately and on command switch and change the shape, style, size, and configuration of any number of crop planter wheels 100 depending on the desired tilling, no-till, soil characteristics, or planting operations and applications, among other factors or conditions disclosed herein.

Figure 9:
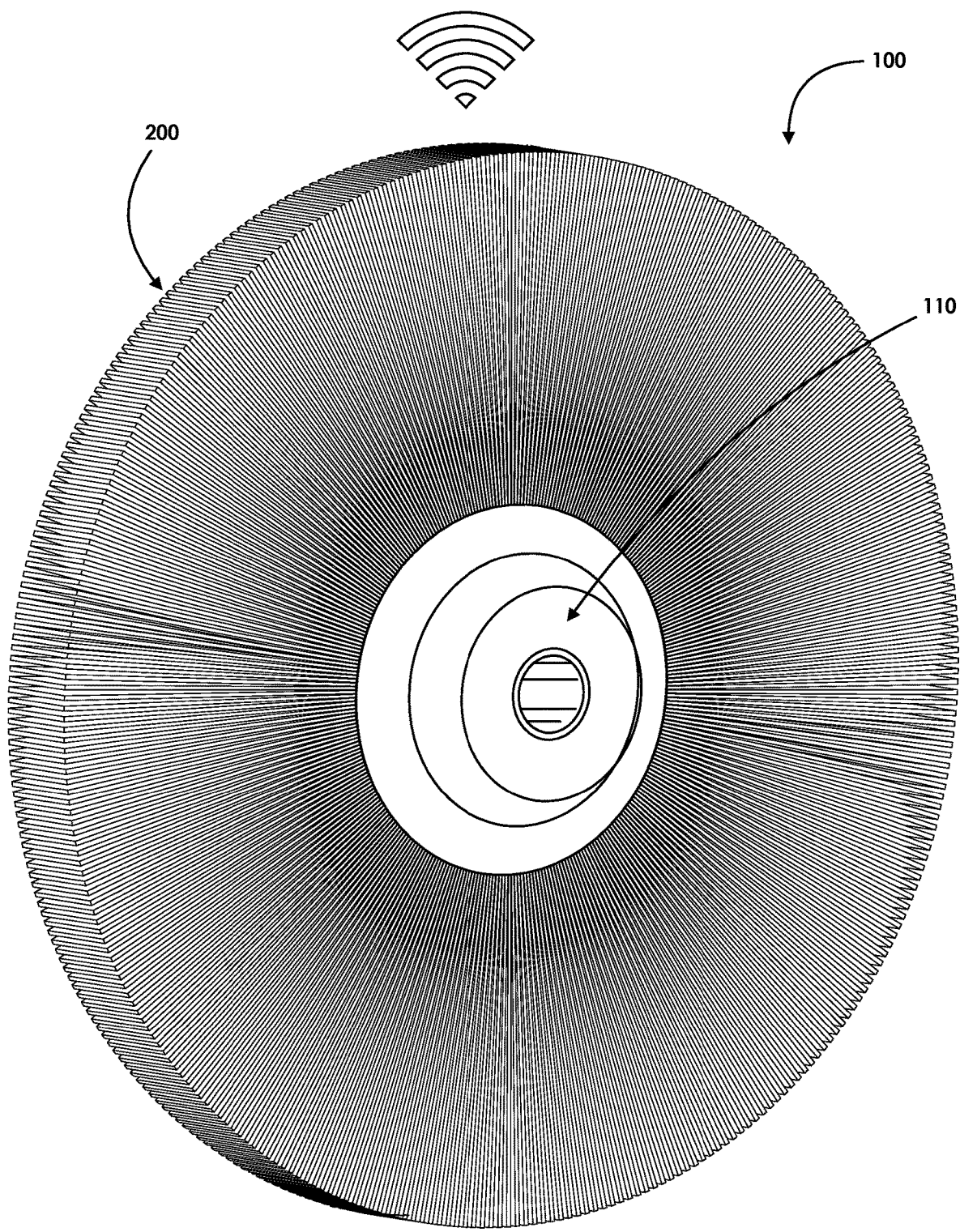
FIG. 9 illustrates a perspective view for another non-limiting exemplary embodiment of a configuration for the dynamically adjustable crop planter wheel of the disclosure described herein.

FIG. 9 illustrates wheel 100 having a hub 110 that allows the wheel to be connected to any axle or shaft of any type of planter or row planter device or system. In addition, actuators 210 or 220 (FIGS. 16A-16D) of the disclosure described herein are also enclosed and covered within hub 110, and further protected from dirt, mud, moisture, and other environmental elements. However, hub 110 may also be removed and opened such that actuators 210 or 220, or any of members 200 can be serviced, maintained, or cleaned. In addition, hub 110 may include the aforementioned controller, or one or more controllers or communication device or networking devices, for communicating remotely, wired, or wirelessly with a network system, including the AI system, such as shown and discussed with respect to FIG. 20, with respect to various operations and control of members 200 of each wheel 100.

Figure 10:
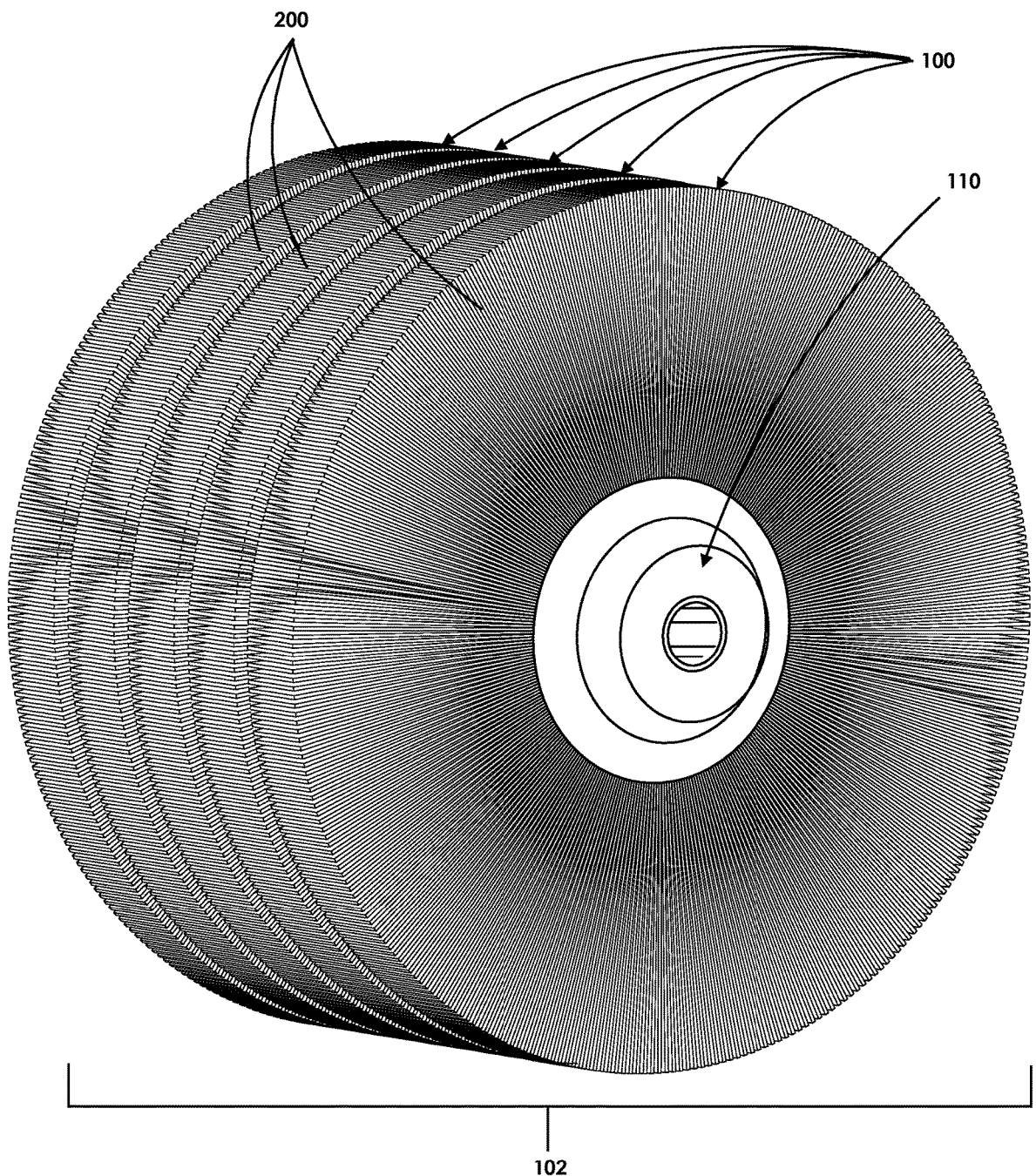
FIG. 10 illustrates a perspective view for another non-limiting exemplary embodiment of a configuration for the dynamically adjustable crop planter wheel of the disclosure described herein.

FIG. 10 depicts a plurality of wheels 100 connected to each other in series or parallel to form one wheel 102. Still referring to FIG. 10, each wheel 100 also includes its own independent hub 110, including its own independent actuators 210 or 220, its own independent controller, and its own independent members 200. Still referring to FIG. 10, each wheel 100 can take on its own shape, size, style, or configuration via each wheel's own independent members 200.

Figure 11:
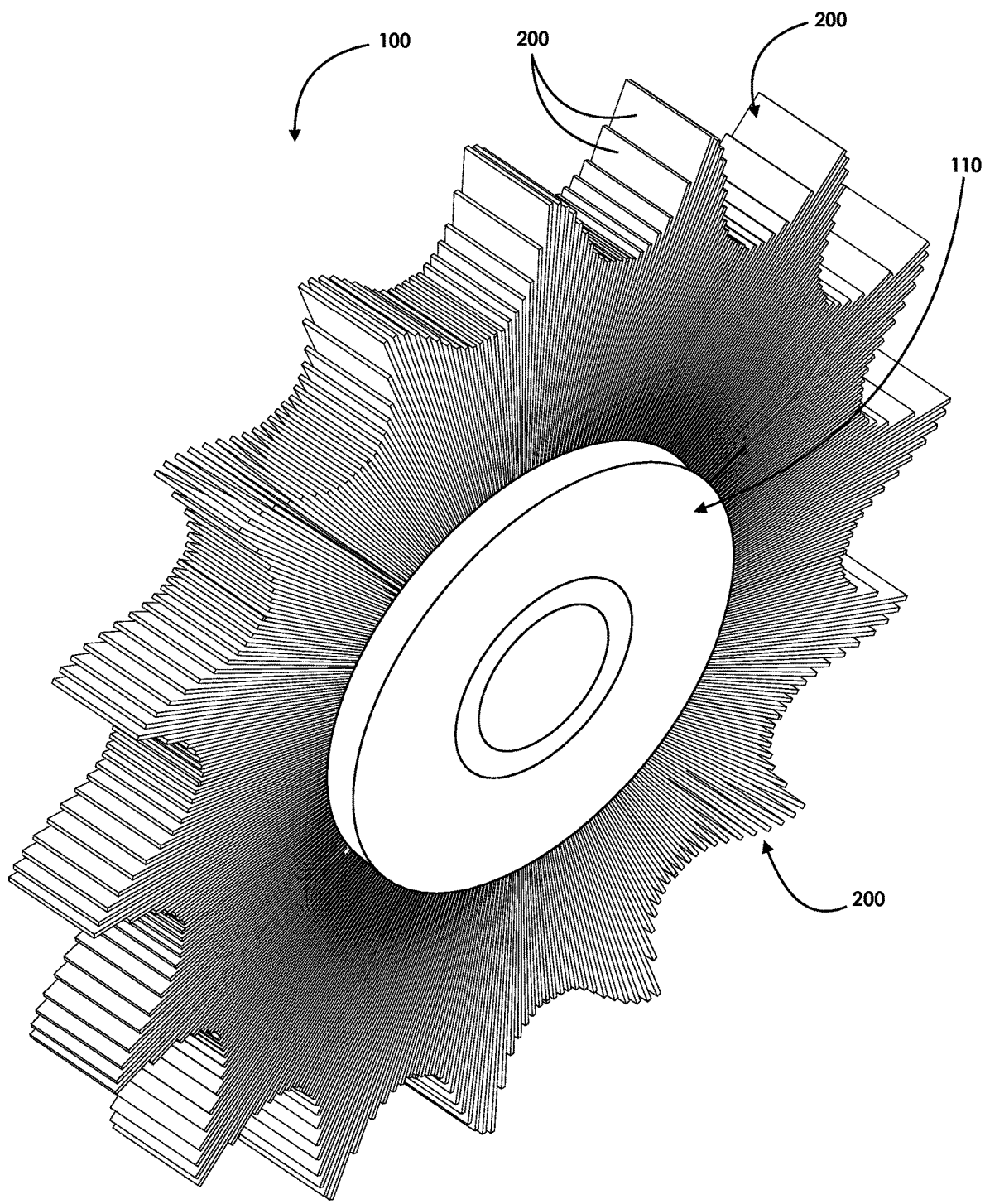
FIG. 11 illustrates a perspective view for another non-limiting exemplary embodiment of a configuration for the dynamically adjustable crop planter wheel of the disclosure described herein.
Figure 12:
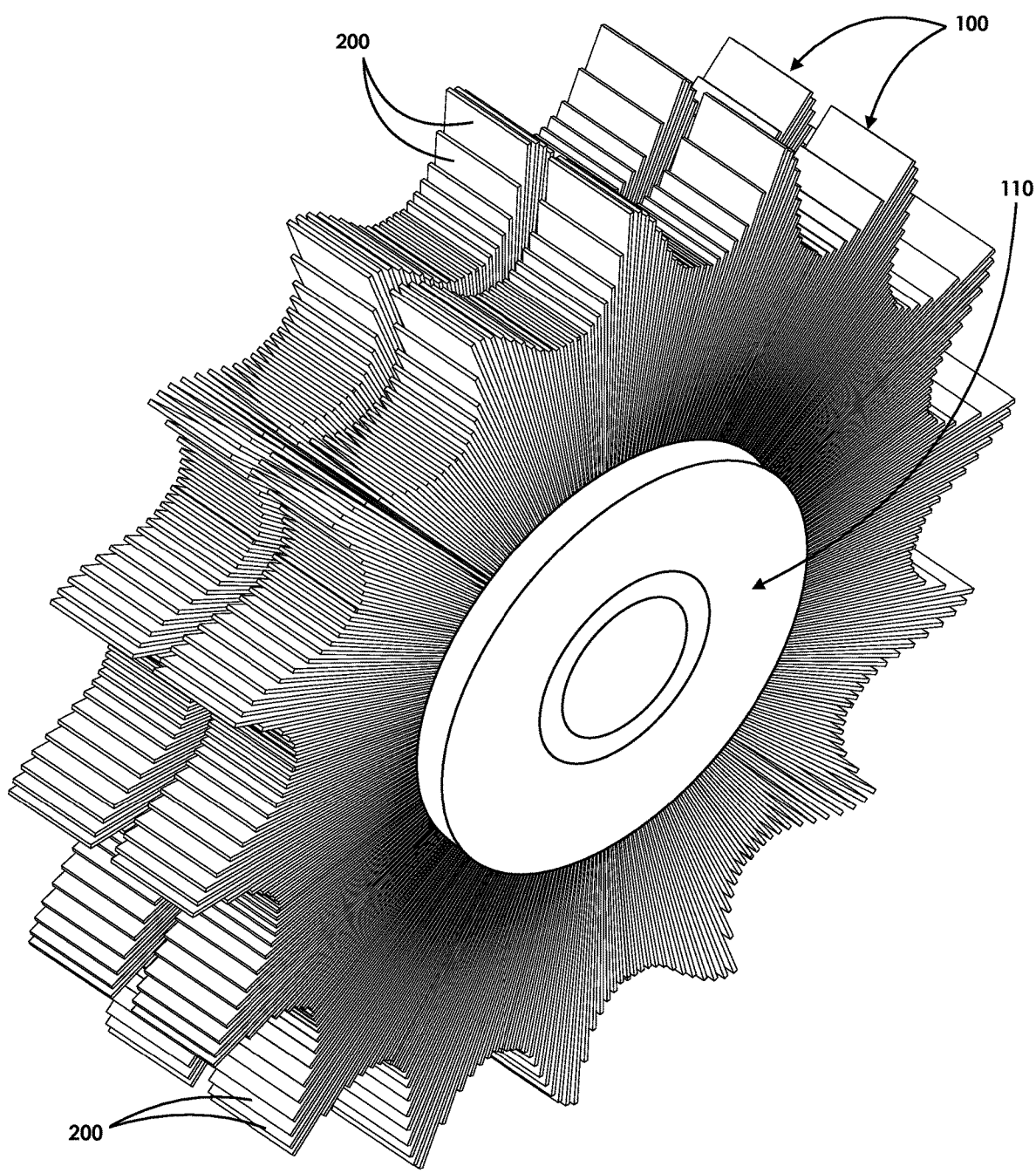
FIG. 12 illustrates a perspective view for another non-limiting exemplary embodiment of a configuration for the dynamically adjustable crop planter wheel of the disclosure described herein.

FIG. 11 illustrates a configuration for wheel 100 wherein members 200, each having a rectangular cross section, form a toothed curved, parabolic curved, or shark-finned orientation to planter wheel 100. FIG. 12 also depicts at least two wheels 100 connected to each other in series or parallel to form one wheel. Still referring to FIG. 12, each wheel 100 also includes its own independent hub 110, including its own independent actuators 210 or 220, controller, and its own independent members 200. As shown in FIG. 12, each wheel 100 can have its outer periphery or perimeter pattern and style match, correspond, or complement the other opposing wheel.

Figure 13:
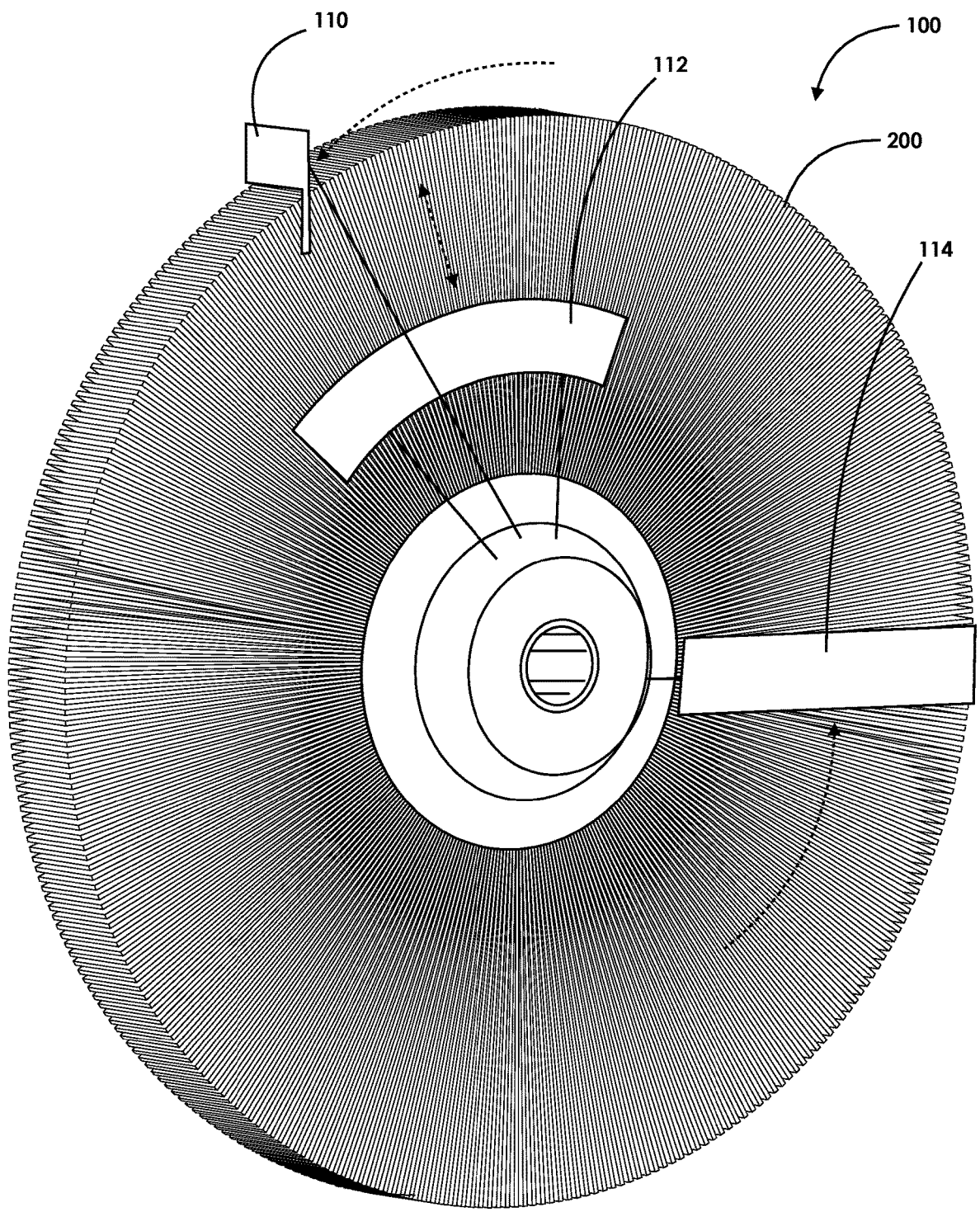
FIG. 13 illustrates a perspective view for another non-limiting exemplary embodiment of a configuration for the dynamically adjustable crop planter wheel of the disclosure described herein, illustrating one non-limiting exemplary embodiment of various cleaning members.
Figure 14A:
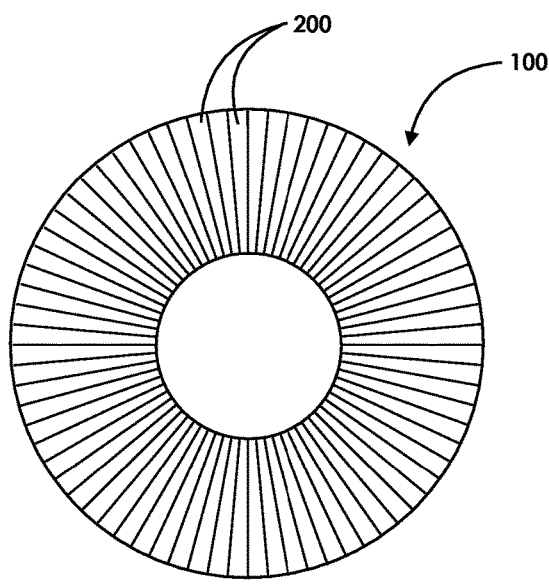
FIGS. 14A-14D each illustrate simplified side views of additional non-limiting exemplary embodiments of configurations for the dynamically adjustable crop planter wheel of the disclosure described herein.
Figure 14B:
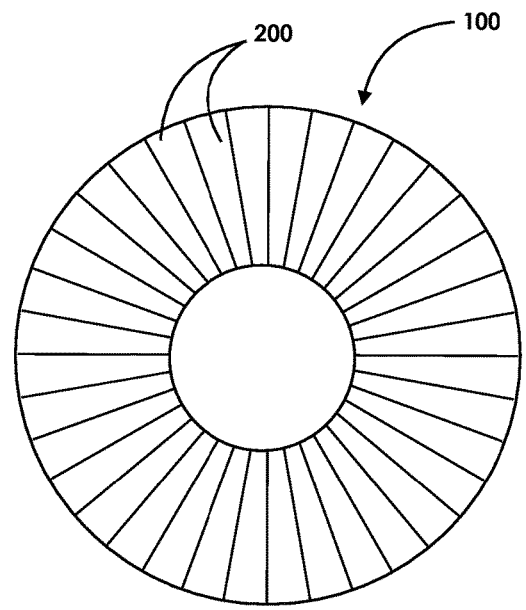
Figure 14C:
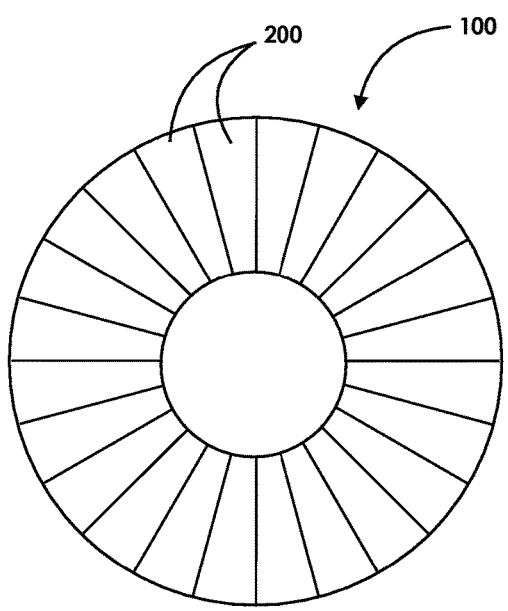
Figure 14D:
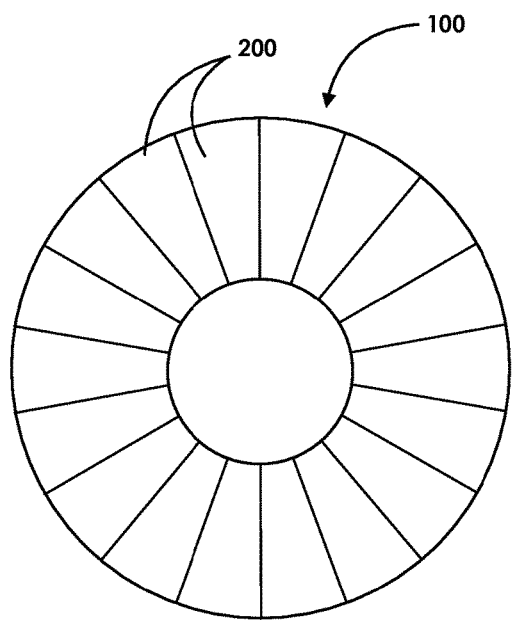

FIG. 13 depicts one non-limiting exemplary embodiment of a cleaning system for any one or more of wheels 100 of the disclosure described herein. Here, each wheel 100 can include a cleaning member 110, 112, and 114. Cleaning members 110, 112, and 114 can be any of a plate, bracket, or blade, wherein each of members 110, 112, and 114 can be supported by brackets or supports secured to hub 110 or any other external support structures. For example, members 110-114 may be fixed to an external structure in which wheel 100 is coupled to for cleaning purposes. In one method of operation, wheel 100 can go into a self-cleaning mode operation whereby it assumes a round or generally circular configuration with its members 200 in their initial state or retracted configuration. Next, as wheel 100 is rotated, turned, or spun, such as via a drive motor, any debris, soil, dirt, or mud accumulated on or about members 200 can be scraped or cleaned off via any one or more of cleaning members 110, 112, and 114. In particular, member 110 assists with catching and cleaning off any debris accumulated on the top region and upper side regions (both left and right) of each member 200, as members 200 revolve and pass thereunder and through member 110. Member 112 (on both sides) assists with catching and cleaning off any debris accumulated on the sides (both left and right) of each member 200, as members 200 revolve and pass against or adjacent to member 112. Alternatively or in addition to, members 200 may also operate to partially or substantially move upwards or downwards (or otherwise articulate or change positions) along the length of each member 200 such that the top and bottom sides or edges of member 112 can further assist in cleaning off the sides of each member 200. Member 114 (on both left and right sides) can also assist with catching and cleaning off any debris accumulated on the left and right sides of each member 200, as members 200 revolve and pass against or adjacent to member 114.

FIGS. 14A-14D further illustrate alternative configurations for wheel 100 and articulating members 200. As shown with respect to FIGS. 14A-14D, each member 200 may have a wedge-shaped configuration with varying outer thicknesses, widths, or radii. The configuration of members 200 shown with respect to FIGS. 14A-14D allow each wheel 100 to have less members 200, while still maintaining a minimum gap or spacing between each member 200. Here, such minimum gap may equal to less than about seven (7) mm.

Figure 15G:
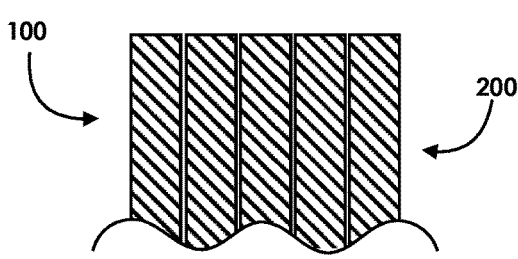
FIG. 15G illustrates a partial front view of the articulating members of the dynamically adjustable crop planter wheel depicted in a row according to one non-limiting exemplary embodiment, further illustrating partial cross-sectional front views of the articulating members.
Figure 15H:
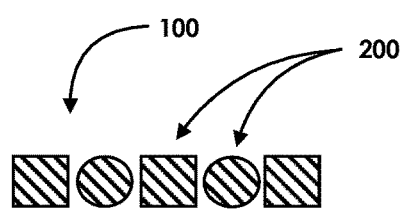
FIG. 15H illustrates a partial top view of the articulating members of the dynamically adjustable crop planter wheel of FIG. 15G, further illustrating partial cross-sectional top views of the articulating members.
Figure 16A:
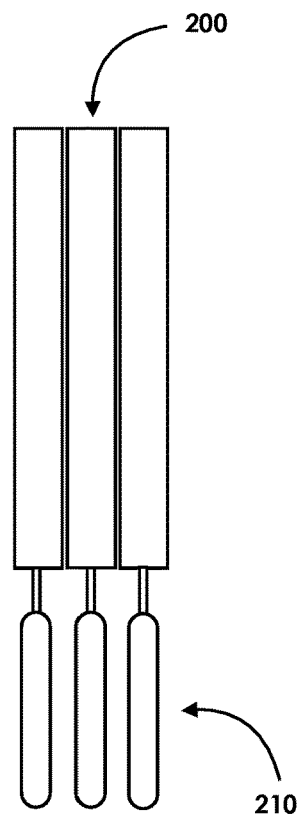
FIGS. 16A-16B illustrates a partial simplified side view of the articulating members of the dynamically adjustable crop planter wheel of the disclosure described herein each in communication with an actuator, and a method of operation, according to one non-limiting exemplary embodiment of the disclosure described herein.
Figure 16B:
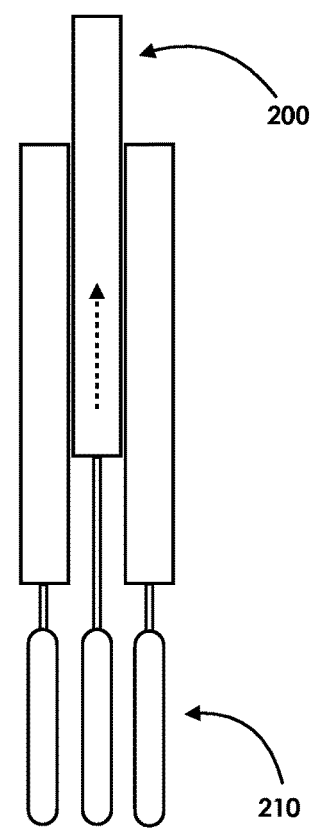
Figure 16C:
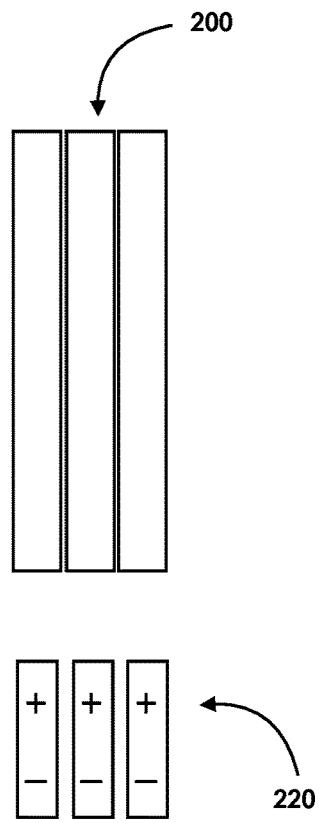
FIGS. 16C-16D illustrates a partial simplified side view of the articulating members of the dynamically adjustable crop planter wheel of the disclosure described herein each in communication with a magnetic force, and a method of operation, according to another non-limiting exemplary embodiment of the disclosure described herein.
Figure 16D:
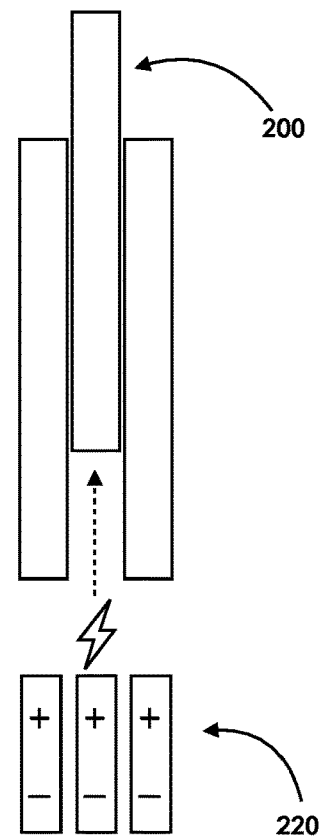

FIGS. 15A-15H illustrates various cross-section configuration embodiments for members 200 of the disclosure described herein. As shown in FIGS. 15A-15H, each wheel 100 can have varying thicknesses or widths via members 200 positioned in parallel next to each other. Accordingly, this allows each wheel 100 to modify its thickness, teeth, or tread pattern across its outer top surface. In addition, as shown FIGS. 15A-15H, each member 200 may have any type of cross-sectional configuration or shape. In addition, other members 200 having one cross-sectional configuration or shape may be combined with another member 200 having another cross-sectional configuration or shape, such as shown in FIGS. 15G-15H.

Figure 17A:
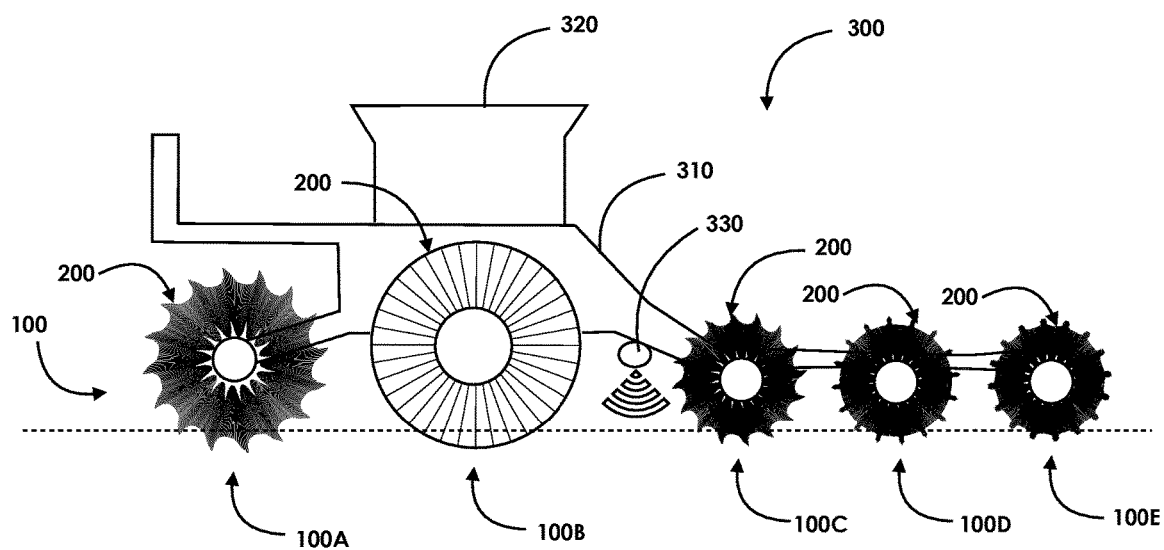
FIG. 17A illustrates a simplified side view for one non-limiting exemplary embodiment a row planter including the dynamically crop planter wheels of the disclosure described herein.
Figure 17B:
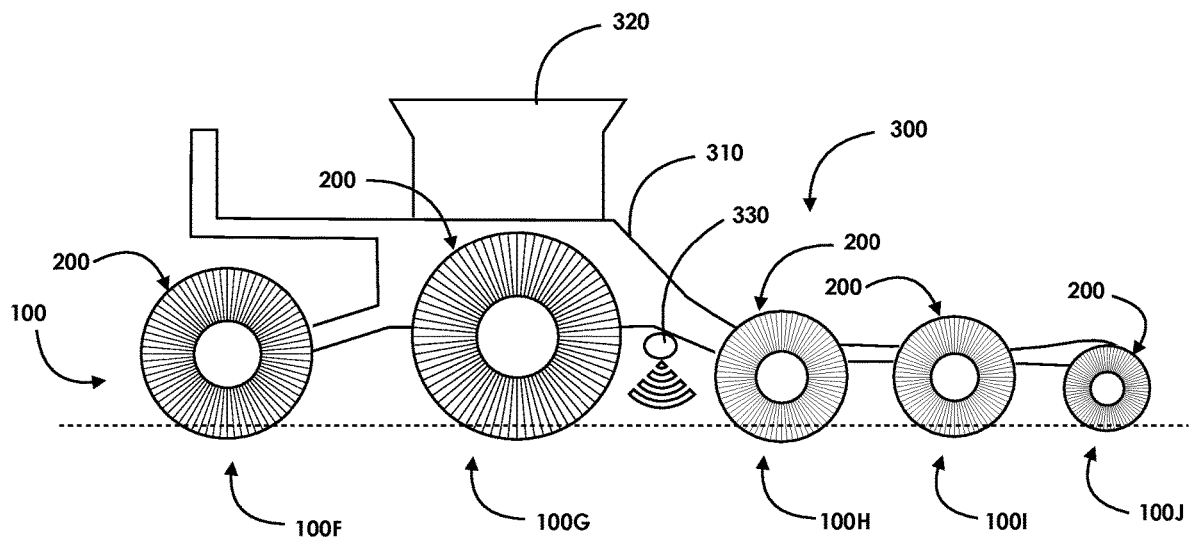
FIG. 17B illustrates a simplified side view for another non-limiting exemplary embodiment of the row planter including the dynamically crop planter wheels of the disclosure described herein.
Figure 18:
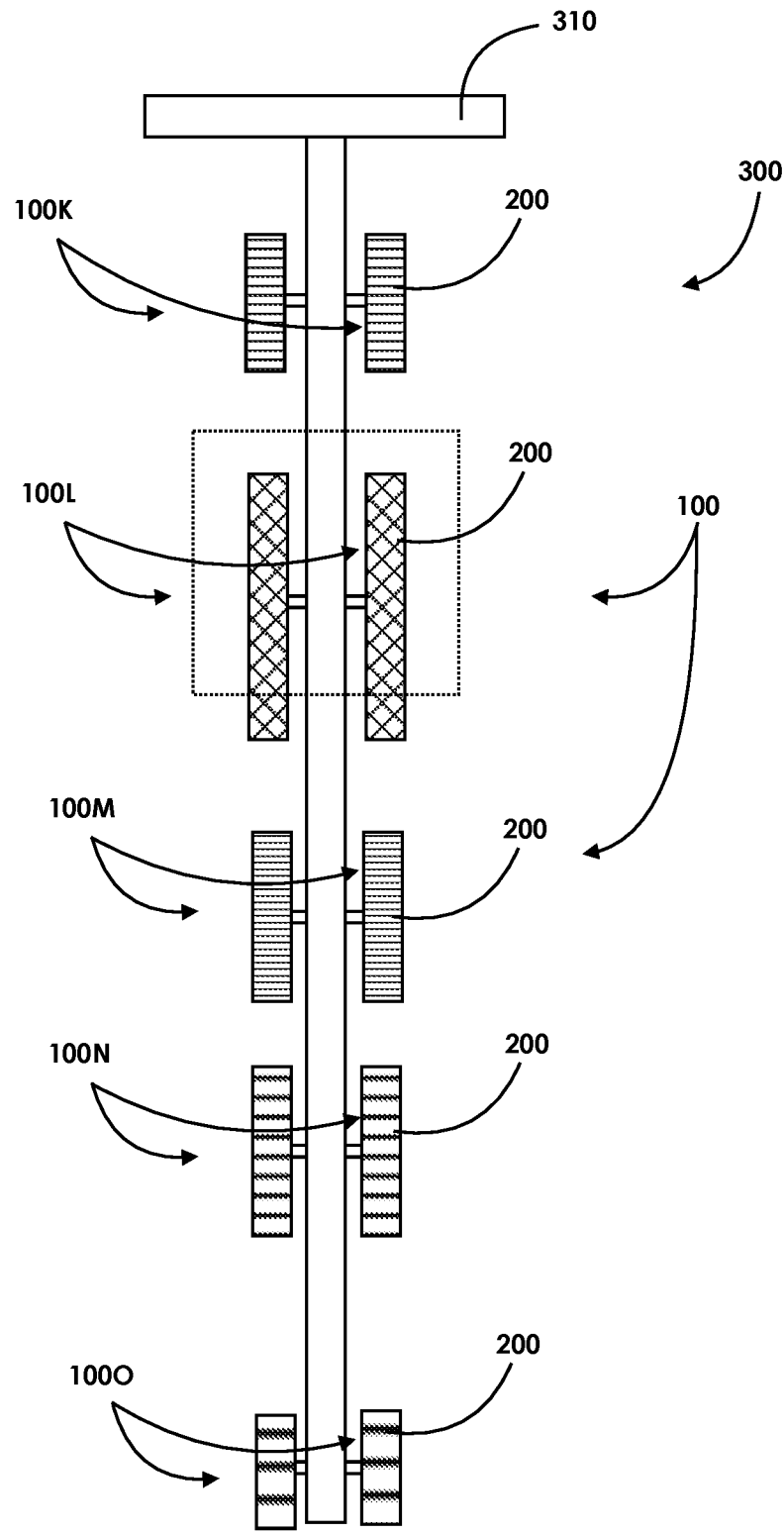
FIG. 18 illustrates a simplified top view for another non-limiting exemplary embodiment of the row planter including the dynamically crop planter wheels of the disclosure described herein.
Figure 19:
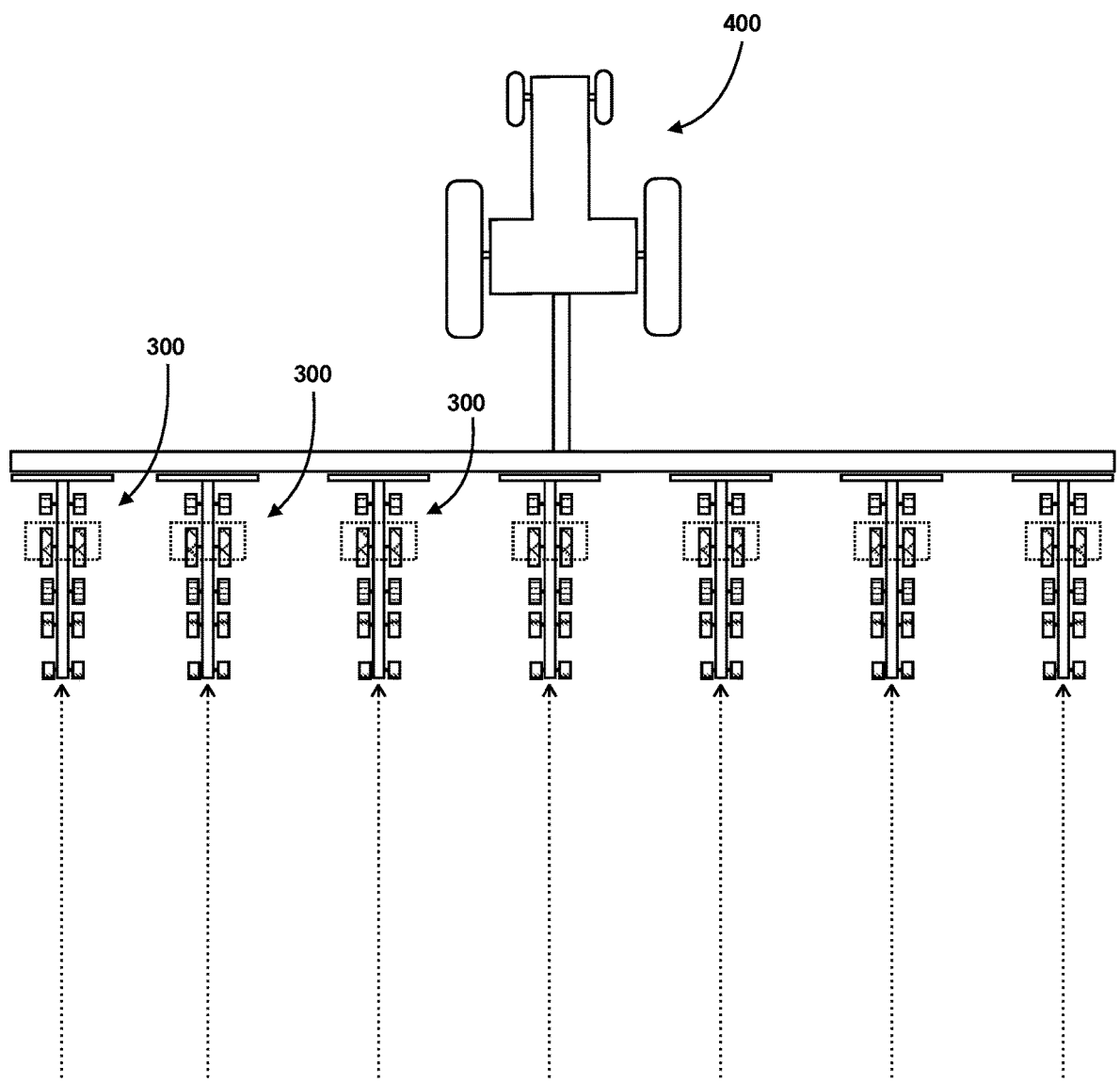
FIG. 19 illustrates a simplified top view for another non-limiting exemplary embodiment of multiple row planters that include the dynamically crop planter wheels of the disclosure described herein.

FIGS. 17A, 17B, and 18 illustrate various embodiments of a planter 300 having a combination of wheels 100, each having their own shape, style and configuration via their respective members 200. In particular, each planter 300 can include a hopper 320 secured to frame 310, wherein any number or pair of wheels 100 may be connected thereto, such as from one (1) pair of wheels up to 10 pair of wheels. In addition, each planter 300 may also include one or mores sensors or cameras 330, which will later be described in detail. It is contemplated within the scope of the present disclosure described herein that planter 300 may be of any shape, size, form, or configuration and having any number of parts, components, or accessories. Referring to FIGS. 17A, 17B, and 18, each individual wheel or disc, such as wheels 100A-100O can have its own independent configuration, size, shape, or style depending on the application and soil characteristics for crop planting, among other factors or conditions previously disclosed herein. For example, each pair of wheels 100A, 100F, and 100K may operate as opening wheels for opening a trench or furrow, each having their own size and configuration depending on the application and soil characteristics. Next, each pair of wheels 100B, 100G, and 100L can operate as depth or gauge wheels. Next, each pair of wheels subsequent to wheels 100B, 100G, and 100L can operate as various closing wheels, for closing the trench, such as wheels 100C-100E (FIG. 17A), 100H-100J (FIG. 17B), and 100M-100O (FIG. 18). Here, it is contemplated within the scope of the present disclosure described herein that the frame 310 of planter 300 can support any number of wheels 100 in series or parallel, such as shown with respect to FIGS. 10 and 12. In addition, each wheel 100 may have any number of members 200 (in any cross-sectional shape) adjacent to each other in a row to form the thickness or width of each wheel, such as shown with respect to FIGS. 15A-15H. FIG. 19 depicts a configuration wherein multiple row planters 300 may be connected to each other and pulled as a trailer via a tractor 300 or any other vehicle for various crop planting and seeding operations.

Referring to FIGS. 17A, 17B, 18 and FIG. 20, planters 300 may also include one or more sensors or video cameras 330 for observing planting operations and/or soil characteristics and conditions, as previously disclosed herein. In addition, each planter 300 may also include one or more on-board computing devices for communicating with and transmitting to and receiving data from any of the one or more sensors or cameras 330, and the terminals or components of FIG. 20, including but not limited to operator 510, third parties 520, portal 530, servers 500, device 540, planters 300, the controller of wheel 100 for members 200, among others. Here, sensors or cameras 330 can include but are not to temperatures sensors, humidity sensors, environmental sensors, air pressure sensors, moisture sensors, fluid pressure sensors, speed sensors, accelerometer sensors, gyroscopes, object detection sensors, infrared sensors or detectors, photographic cameras, image capturing device, and video cameras, among others. In addition, it is contemplated within the scope of the present disclosure described herein that the sensors or cameras 330 may positioned or located at anywhere on planter 300. In addition, each wheel 100 may include its own independent sensors that communicate with sensors 330 or elements 500-540 of the network shown in FIG. 20. The computerized or automated AI system of the disclosure described herein can also send commands to the planer 300 or the controller of each wheel 100 to adjust sensor sensitivity that can adjust how sensitive the sensors are to various conditions, parameters, benchmarks, goals or metrics. In addition, the computerized or automated AI system can adjust reaction sensitivity that change how quickly the computerized or automated AI system will react or give inputs or commands to change a each wheel's configuration.

Still referring to FIGS. 17A, 17B, 18 and FIG. 20, and images or video obtained or captured from cameras 330 may also be transmitted and processed by servers 500, operator 510, third parties 520, portal 530, or user devices 540. For example, image or video obtained from cameras 330 may be used to detect errors, malfunctions, seed damage, seed loss, anomalies, soil conditions, soil characteristics, mud, and debris or damage to wheels 100 or members 200, among others. Here, such errors can be detected manually via an operator or via video image analysis or via the computerized automated AI system of the disclosure described herein. Specifically, the computer-based methods or automated AI system of the disclosure described herein can capture, stream, transmit, save, and record images or video and/or metadata of the threshed or unthreshed crop from various points of the planter during planting, tilling, or seeding operations, and compare such captured images or video to prior historical or benchmark images or video of the crop or seed to determine if there is seed loss or seed damage with respect to that specific crop being planted and automatically adjust the configuration of members 200 to desired style or configuration for each wheel 100 as disclosed herein. In particular, the AI system of the disclosure described herein can send commands to each planter 300 or the controller of each wheel 100 to adjust the configuration and style of each wheel (via its members 200) in light of additional inputted or received conditions, such as operational or performance parameters (input parameters by operator or AI system the combine is to operate within), operational or performance benchmarks (standards for operating or performance data to be compared to), operational or performance goals (performance goals input by the operator or AI system the combine is to optimize by changing various controllers or wheel 100 or member 200 settings), operational or performance priorities (priority or weight of specific targeted goal), operational or performance sensitivity (time of reaction to deviations to performance parameters or goals), weather data, historical data (information from every sensor or metric the combine records, typically store in a database), planter fleet information (information shared from network or other combine harvesters), global positioning system (GPS) information, harvest data (yield maps from current and previous harvest at a particular GPS location), among others. Here, any one or more of the aforementioned conditions, information, or data can be used advantageously to adjust the amount of modification or adjustment to the positions of each member 200 of each wheel 100 of a planter using the controller and actuators of each wheel, among others.

Figure 20:
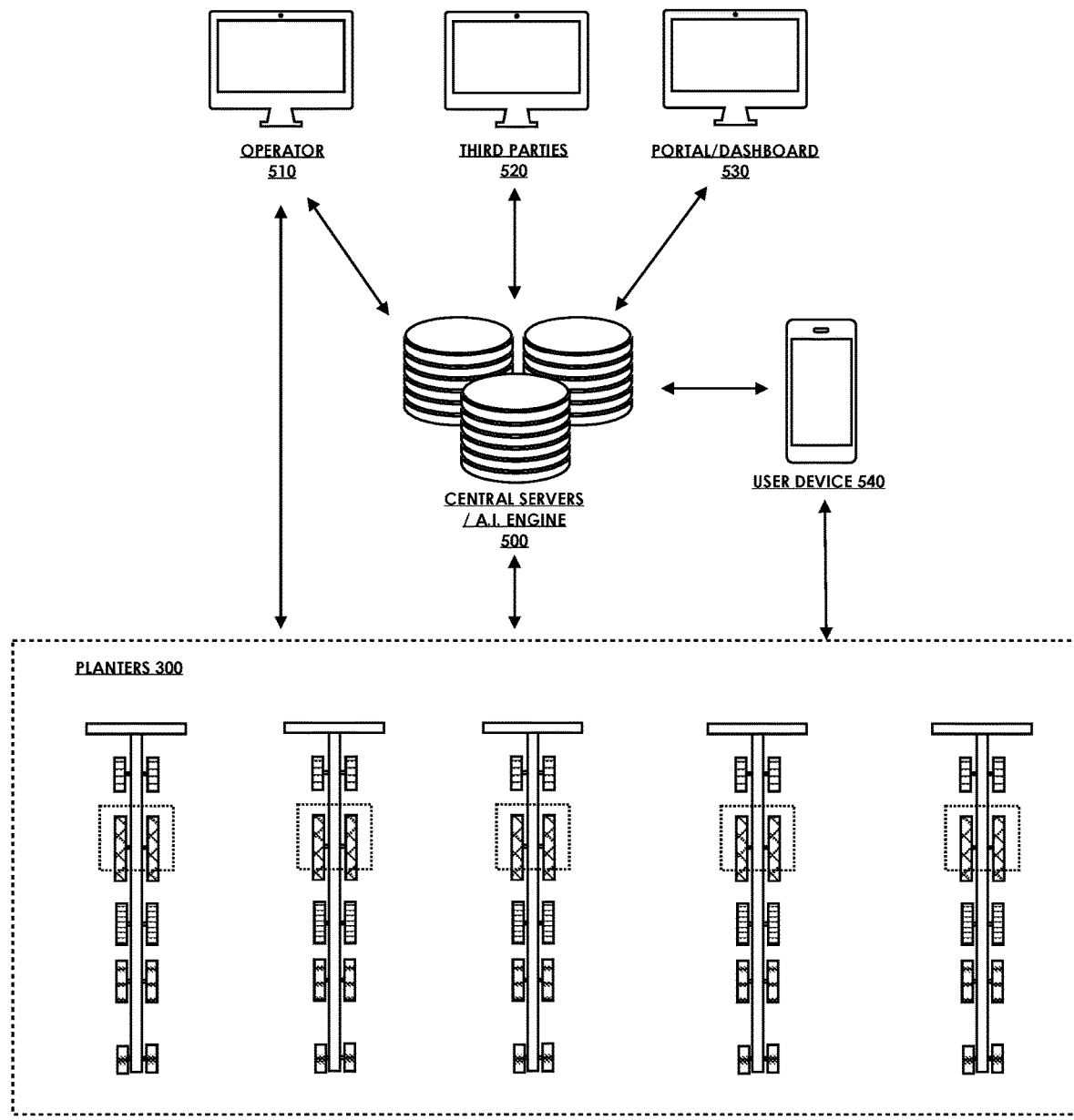
FIG. 20 illustrates a block diagram for one non-limiting exemplary embodiment of a general network architecture for controlling and operating the row planters and the dynamically crop planter wheels of the disclosure described herein.

Still referring to FIG. 20, each concave planter 300 (or each wheel 100 of each planter 300) may also communicate bi-directionally, wirelessly or wired, with an operator terminal 510 or with a user device terminal 540. Here, operator 510 or user device 540 may be any type of computing device that may have one or more software or applications or "apps" residing locally thereon that can communicate with, transmit and receive commands and data, and operate one or more controllers or actuators of each wheel 100, each member 200, or group of members 200 of each wheel 100. For example, this can include scheduling planting operations, performance, historical data, and monitoring soil conditions, among others. In addition, each operator 510 or user device 540 may also communicate bi-directionally, wired or wirelessly, with central servers 500. In addition, operator 510 or user device 540 may also include one or more, or all, of the aforementioned computer-based methods, such as the automated AI and machine learning systems of the disclosure described herein. The disclosure described herein may also include one or more third party computing systems 520 communicating bi-directionally, wired or wirelessly, with that of central servers 500 or planters 300. Here, any of the third party systems or terminals 520 may include various data or information to be used by the aforementioned computer-based methods of the disclosure described herein to determine and calculate optimal configuration and style of each wheel 100 for an application, which can include information or data from any one or more of the aforementioned conditions or data.

From the foregoing it will be seen that the present disclosure described herein is one well adapted to attain all ends and objectives herein-above set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts described herein, except insofar as such limitations are included in following claims. Further, it will be understood that certain features and sub-combinations are of utility and may be employed without reference to other features and sub-combinations. This is contemplated by and is within the scope of the claims.

What is claimed is:

1. An adjustable crop planter, comprising:
   a soil working tool comprising a first plurality of members projecting from a central hub in an extended position, wherein the first plurality of members are disposed in a first concentric configuration;
   the soil working tool further comprising a second plurality of members projecting from the central hub in a retracted position relative to the extended position of the first plurality of members, wherein the second plurality of members are disposed in a second concentric configuration;
   the soil working tool further comprising one or more actuators in communication with the first and second plurality of members, wherein the one or more actuators are configured to move each of the first and second plurality of members such that the first and second plurality of members move independently and relative to each other; and
   a controller in communication with the one or more actuators.

2. The adjustable crop planter of claim 1, wherein the first and second plurality of members each have a corresponding actuator.

3. The adjustable crop planter of claim 1, wherein the one or more actuators are comprised of at least one of: a hydraulic member, pneumatic member, electric member, thermal member, magnetic member, mechanical member, various micro mechanical systems, micro-actuators, micro-sensors, and micro-electronics such as micro-electromechanical systems (MEMS) devices and actuators, electric motor, DC motor, brush motor, brushless motor, AC brushless motor, DC brushless motor, direct drive, linear motor, servo motors, stepper motor, or variable speed motor.

4. The adjustable crop planter of claim 1, wherein the first or second plurality of members are configured to adjust a configuration of an outer perimeter of the soil working tool.

5. The adjustable crop planter of claim 1, wherein the first and second concentric configurations of the first and second plurality of members substantially represent a toothed or serrated wheel.

6. The adjustable crop planter of claim 1, wherein the first or second plurality of members are comprised of at least one of: rods, bars, poles, shafts, shanks, spokes, or pillars.

7. The adjustable crop planter of claim 1, wherein each of the first and second plurality of members are disposed at predefined spacings relative to each other or disposed at equal spacings relative to each other.

8. The adjustable crop planter of claim 1, wherein the first and second plurality of members are coupled to a crop row planter.

9. The adjustable crop planter of claim 1, wherein the controller is operated via an artificial intelligence system, a neural network, or a machine learning algorithm.

10. The adjustable crop planter of claim 1, further comprising one or more sensors for detecting one or more of: soil composition, soil temperature, atmospheric temperature, planter depth, soil moisture, planter speed, planter downforce, seed type, seed treatment, seed-to-soil contact, soil density around seed, crop residue in furrow, salt density, oxygenation efficiency, furrow depth, furrow width, furrow closure, residue cover or depth, tillage or no-tillage, tiled or not tiled, drainage, seed orientation, coulter depth, furrow opening, furrow side-wall compaction, cloddy soil density, soil compaction density, seed rot percentage, seed variety, seed brand, seed size, seed shape, seed density, seed coating, seed population, seed singulator, seed cell, seed firmer, seed disc, seed drum, seed trench, meter type, meter speed, meter size, meter accuracy, seed spacing, seed skips, seed multiples, seed uniformity, hopper volume, hopper weight, weed density, chemicals sprayed, planting dates, disc size, drum size, disk weight, brush settings, seeding rates, air pressure, vacuum pressure, vacuum settings, tire pressure, toolbar alignment, toolbar settings, hitch alignment, land slope, land drainage, carrying wheels, gauge wheels, tractor speed, planter speed, among others, atmospheric temperature, humidity, elevation, pressure, wheel weight, wheel diameter, wheel configurations, wheel weight, wheel diameter, wheel composition, plant emergence and yield data, global positioning information, yield, disease, maturity times, planting population, plant emergence consistency, germination, seed orientation, seed rot percentage, furrow side-wall compaction, coulter depth, seed variety, seed brand, seed treatment, weed density, chemicals sprayed, planting dates, and seeding rates.

11. An adjustable crop planter, comprising:
    a crop planter frame;
    a seed receiving member coupled to the crop planter frame;
    a first soil tool and a second soil tool secured to the crop planter frame, wherein the first soil tool is on a first axle and the second soil tool is on a second axle;
    the first soil tool and the second soil tool each further comprising:
       a first plurality of members projecting from a central hub in an extended configuration, wherein the first plurality of members are disposed in a radial pattern;

a second plurality of members projecting from the central hub in a retracted configuration, wherein the first plurality of members are disposed in a radial pattern;

one or more actuators in communication with the first and second plurality of members, wherein the one or more actuators are configured to move each of the first and second plurality of members such that the first plurality of members move independently and relative to the second plurality of members; and a controller in communication with the one or more actuators.

12. An adjustable crop planter, comprising:

a soil tool comprising a first plurality of members projecting from a central hub of the soil tool in an extended configuration, wherein the extended configuration is in a uniform radial pattern;

the soil tool further comprising a second plurality of members projecting from the central hub of the soil tool in a retracted configuration relative to the first plurality of members, wherein the retracted configuration is in a uniform radial pattern;

the soil tool further comprising one or more first actuators in communication with the first plurality of members, wherein the one or more first actuators are configured to move each of the first plurality of members into the extended configuration wherein the first plurality of members move relative to the second plurality of members; and the soil tool further comprising one or more second actuators in communication with the second plurality of members, wherein the one or more second actuators are configured to move each of the second plurality of members into the retracted configuration wherein the second plurality of members move relative to the first plurality of members.

13. The adjustable crop planter of claim 12, further comprising a controller in communication with the one or more actuators configured to operate the one or more actuators.

14. The adjustable crop planter of claim 13, wherein the controller is operated via an artificial intelligence system, a neural network, or a machine learning algorithm.

15. The adjustable crop planter of claim 14, further comprising one or more sensors for detecting one or more of: soil composition, soil temperature, atmospheric temperature, planter depth, soil moisture, planter speed, planter downforce, seed type, seed treatment, seed-to-soil contact, soil density around seed, crop residue in furrow, salt density, oxygenation efficiency, furrow depth, furrow width, furrow closure, residue cover or depth, tillage or no-tillage, tiled or not tiled, drainage, seed orientation, coulter depth, furrow opening, furrow side-wall compaction, cloddy soil density, soil compaction density, seed rot percentage, seed variety, seed brand, seed size, seed shape, seed density, seed coating, seed population, seed singulator, seed cell, seed firmer, seed disc, seed drum, seed trench, meter type, meter speed, meter size, meter accuracy, seed spacing, seed skips, seed multiples, seed uniformity, hopper volume, hopper weight, weed density, chemicals sprayed, planting dates, disc size, drum size, disk weight, brush settings, seeding rates, air pressure, vacuum pressure, vacuum settings, tire pressure, toolbar alignment, toolbar settings, hitch alignment, land slope, land drainage, carrying wheels, gauge wheels, tractor speed, planter speed, among others, atmospheric temperature, humidity, elevation, pressure, wheel weight, wheel diameter, wheel configurations, wheel weight, wheel diameter, wheel composition, plant emergence and yield data, global positioning information, yield, disease, maturity times, planting population, plant emergence consistency, germination, seed orientation, seed rot percentage, furrow side-wall compaction, coulter depth, seed variety, seed brand, seed treatment, weed density, chemicals sprayed, planting dates, and seeding rates.

16. The adjustable crop planter of claim 11, wherein the controller is operated via an artificial intelligence system, a neural network, or a machine learning algorithm.

17. The adjustable crop planter of claim 11, further comprising one or more sensors for detecting one or more of: soil composition, soil temperature, atmospheric temperature, planter depth, soil moisture, planter speed, planter downforce, seed type, seed treatment, seed-to-soil contact, soil density around seed, crop residue in furrow, salt density, oxygenation efficiency, furrow depth, furrow width, furrow closure, residue cover or depth, tillage or no-tillage, tiled or not tiled, drainage, seed orientation, coulter depth, furrow opening, furrow side-wall compaction, cloddy soil density, soil compaction density, seed rot percentage, seed variety, seed brand, seed size, seed shape, seed density, seed coating, seed population, seed singulator, seed cell, seed firmer, seed disc, seed drum, seed trench, meter type, meter speed, meter size, meter accuracy, seed spacing, seed skips, seed multiples, seed uniformity, hopper volume, hopper weight, weed density, chemicals sprayed, planting dates, disc size, drum size, disk weight, brush settings, seeding rates, air pressure, vacuum pressure, vacuum settings, tire pressure, toolbar alignment, toolbar settings, hitch alignment, land slope, land drainage, carrying wheels, gauge wheels, tractor speed, planter speed, among others, atmospheric temperature, humidity, elevation, pressure, wheel weight, wheel diameter, wheel configurations, wheel weight, wheel diameter, wheel composition, plant emergence and yield data, global positioning information, yield, disease, maturity times, planting population, plant emergence consistency, germination, seed orientation, seed rot percentage, furrow side-wall compaction, coulter depth, seed variety, seed brand, seed treatment, weed density, chemicals sprayed, planting dates, and seeding rates.

* * * * *